US012689413B2

(12) United States Patent
Jian et al.

(10) Patent No.: US 12,689,413 B2
(45) Date of Patent: Jul. 21, 2026

(54) SERVING USER DEVICES WITH INTELLIGENT REFLECTING DEVICES

(71) Applicant: ZTE Corporation, Shenzhen (CN)

(72) Inventors: Mengnan Jian, Shenzhen (CN); Yajun Zhao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 18/521,025

(22) Filed: Nov. 28, 2023

(65) Prior Publication Data

US 2024/0171225 A1     May 23, 2024

Related U.S. Application Data

(63) Continuation of application No. PCT/CN2021/099333, filed on Jun. 10, 2021.

(51) Int. Cl.
*H04B 7/04* (2017.01)
*H01Q 15/00* (2006.01)
*H04B 1/00* (2006.01)

(52) U.S. Cl.
CPC ..... *H04B 7/04013* (2023.05); *H01Q 15/0086* (2013.01); *H04B 1/0003* (2013.01)

(58) Field of Classification Search
CPC .............. H04B 7/04013; H04B 1/0003; H04B 7/0617; H04B 7/06952; H01Q 15/0086; H01Q 15/0006; H01Q 15/147; H04W 24/08; H04W 64/00
USPC .......................................... 375/219–222, 262
See application file for complete search history.

(56) References Cited

U.S. PATENT DOCUMENTS

| | | | |
|---|---|---|---|
| 6,198,528 B1 * | 3/2001 | Maynard | .............. H04B 10/801 398/151 |
| 11,978,752 B2 | 5/2024 | Devlin et al. | |
| 2008/0161055 A1 | 7/2008 | Fischer | |
| 2014/0354479 A1 | 12/2014 | Britz et al. | |
| 2018/0324690 A1 | 11/2018 | Wang et al. | |
| 2019/0260120 A1 | 8/2019 | Khushrushahi et al. | |
| 2019/0364492 A1 | 11/2019 | Azizi et al. | |

(Continued)

FOREIGN PATENT DOCUMENTS

| | | |
|---|---|---|
| CN | 110839204 A | 2/2020 |
| CN | 111542054 A | 8/2020 |

(Continued)

OTHER PUBLICATIONS

Extended European Search Report issued in European Application No. 21944577.2 dated Jan. 3, 2025 (11 pages).

(Continued)

*Primary Examiner* — Emmanuel Bayard
(74) *Attorney, Agent, or Firm* — Crowell & Moring LLP

(57) ABSTRACT

This document generally relates to a system including wireless access nodes and user devices that communicate with each other via one or more intelligent reflecting devices. An intelligent reflecting device may have a surface covered by a least one metasurface layer configured to filter at least one of incoming signals or outgoing signals. In addition or alternatively, an intelligent reflecting device or a wireless access node may determine which user devices to include in a user group to serve based on telecom operator and/or user identification information communicated to the intelligent reflecting device.

19 Claims, 4 Drawing Sheets

900

(56) References Cited

U.S. PATENT DOCUMENTS

| | | | |
|---|---|---|---|
| 2021/0051658 A1 | 2/2021 | Park et al. | |
| 2021/0058137 A1 | 2/2021 | Yekan et al. | |
| 2021/0081712 A1* | 3/2021 | Saunders | G06N 3/0464 |
| 2021/0126359 A1 | 4/2021 | Kim et al. | |
| 2021/0143555 A1* | 5/2021 | Akselrod | H01Q 15/0053 |
| 2022/0077919 A1* | 3/2022 | Li | H04B 7/04013 |
| 2022/0309283 A1* | 9/2022 | Orevi | G06V 40/193 |
| 2022/0377730 A1* | 11/2022 | Yang | H04W 52/36 |
| 2023/0176174 A1* | 6/2023 | Penna | H01Q 3/46 342/451 |
| 2023/0208479 A1* | 6/2023 | Wang | H04B 7/0617 375/262 |
| 2023/0258759 A1* | 8/2023 | Wang | G01S 1/0423 455/456.1 |
| 2024/0088947 A1 | 3/2024 | Yao et al. | |
| 2024/0284289 A1 | 8/2024 | Ly et al. | |
| 2024/0305335 A1 | 9/2024 | Elshafie et al. | |
| 2024/0364388 A1 | 10/2024 | Celik et al. | |

FOREIGN PATENT DOCUMENTS

| | | | |
|---|---|---|---|
| CN | 111698010 A | 9/2020 | |
| CN | 111901014 A | 11/2020 | |
| CN | 11203877 A | 12/2020 | |
| JP | 2008-160346 A | 7/2008 | |
| JP | 2010-515347 A | 5/2010 | |
| JP | 2011-004419 A | 1/2011 | |
| JP | 2014-049777 A | 3/2014 | |
| JP | 2021-057723 A | 4/2021 | |
| KR | 10-2020-0006934 A | 1/2020 | |
| WO | WO 2022/000408 A1 | 1/2022 | |
| WO | WO 2022/133958 A1 | 6/2022 | |
| WO | WO 2022/236538 A1 | 11/2022 | |

OTHER PUBLICATIONS

Gong, Shimin et al.; "Toward Smart Radio Environment for Wireless Communications via Intelligent Reflecting Surfaces: A Comprehensive Survey", Cornell University Library, 201 Olin Library Cornell University Ithaca, NY 14853, Dec. 17, 2019, XP081560019 (31 pages).

Shahab, Muhammad Basit et al.; "Grant-Free Non-Orthogonal Multiple Access for IoT: A Survey", IEEE Communications Surveys & Tutorials, IEEE, May 19, 2020, pp. 1805-1838, vol. 22, No. 3, XP 011807028 (34 pages).

International Search Report and Written Opinion for International Application No. PCT/CN2021/099333 mailed Mar. 10, 2022 (6 pages).

Japanese-language Office Action issued in Japanese Application No. 2023-573377 dated Jun. 17, 2025, with English translation (17 pages).

International Search Report and Written Opinion for International Application No. PCT/CN2021/099325 mailed Mar. 1, 2022 (6 pages).

Extended European Search Report issued in European Patent Application No. 21944575.6 dated Jan. 20, 2025, 11 pages.

Office Action issued in U.S. Appl. No. 18/520,992 dated Jun. 16, 2025 (16 pages).

Notice of Allowance for U.S. Appl. No. 18/520,992 mailed Oct. 20, 2025 (8 pages).

Japanese Office Action issued in Application No. 2023-573377 mailed Dec. 15, 2025, with English translation (5 pages).

Notice of Allowance issued in U.S. Appl. No. 18/520,992 on Jan. 2, 2026 (8 pages).

Corrected Notice of Allowability issued in U.S. Appl. No. 18/520,992 on Jan. 8, 2026 (5 pages).

Korean Office Action issued in Application No. 10-2023-7041076 on Jan. 26, 2026, including English translation (10 pages).

Qurrant-Ul-Ain Nadeem, "Intelligent Reflecting Surface Assisted Wireless Communication: Modeling and Channel Estimation", arXiv:1906.02360v2, Dec. 13, 2019 (7 pages).

Korean Office Action issued in Application No. 10-2023-7040596 on Jan. 19, 2026, including English translation (12 pages).

Nhan Thanh Nguyen et al., "Hybrid Relay-Reflecting Intelligent Surface-Assisted Wireless Communication", arXiv:2103.03900v1, Mar. 5, 2021 (13 pages).

* cited by examiner

700

800

900

SERVING USER DEVICES WITH INTELLIGENT REFLECTING DEVICES

CROSS-REFERENCE TO RELATED APPLICATIONS

This application is a continuation of International Application No. PCT/CN2021/099333, filed Jun. 10, 2021. The contents of International Application No. PCT/CN2021/099333 are herein incorporated by reference in their entirety.

TECHNICAL FIELD

This document is directed generally to intelligent reflecting devices in wireless communications.

BACKGROUND

Spectrum is a critical resource for wireless communication. Wireless communication uses multiple frequency bands for transmission to achieve larger capacity, obtain a higher achievable rate, support high-speed and low-latency transmission, and serve more users. Exploration of high-frequency resources such as millimeter-wave and terahertz frequency bands may enhance the spectrum of wireless communications. Ways to improve wireless communication when simultaneously using multiple frequency bands may be desirable.

SUMMARY

This document relates to methods, systems, apparatuses and devices for use of intelligent reflecting devices in wireless communications. In some implementations, a method is disclosed. The method includes: outputting, with a surface of an intelligent reflecting device, an output signal; and filtering, with at least one metasurface layer covering the surface of an intelligent reflecting device, the signal to generate a filtered signal.

In some other implementations, a system including one or more intelligent reflecting devices may implement the method above.

In yet some other implementations, a computer program product is disclosed. The computer program product may include a non-transitory computer-readable program medium with computer code stored thereupon, the computer code, when executed by a processor of an intelligent reflecting device, causes the intelligent reflecting device to implement the method above.

The above and other aspects and their implementations are described in greater detail in the drawings, the descriptions, and the claims.

DETAILED DESCRIPTION

The present description describes various embodiments of systems, apparatuses, devices, and methods for wireless communications involving one or more intelligent reflecting devices.

Figure 1:
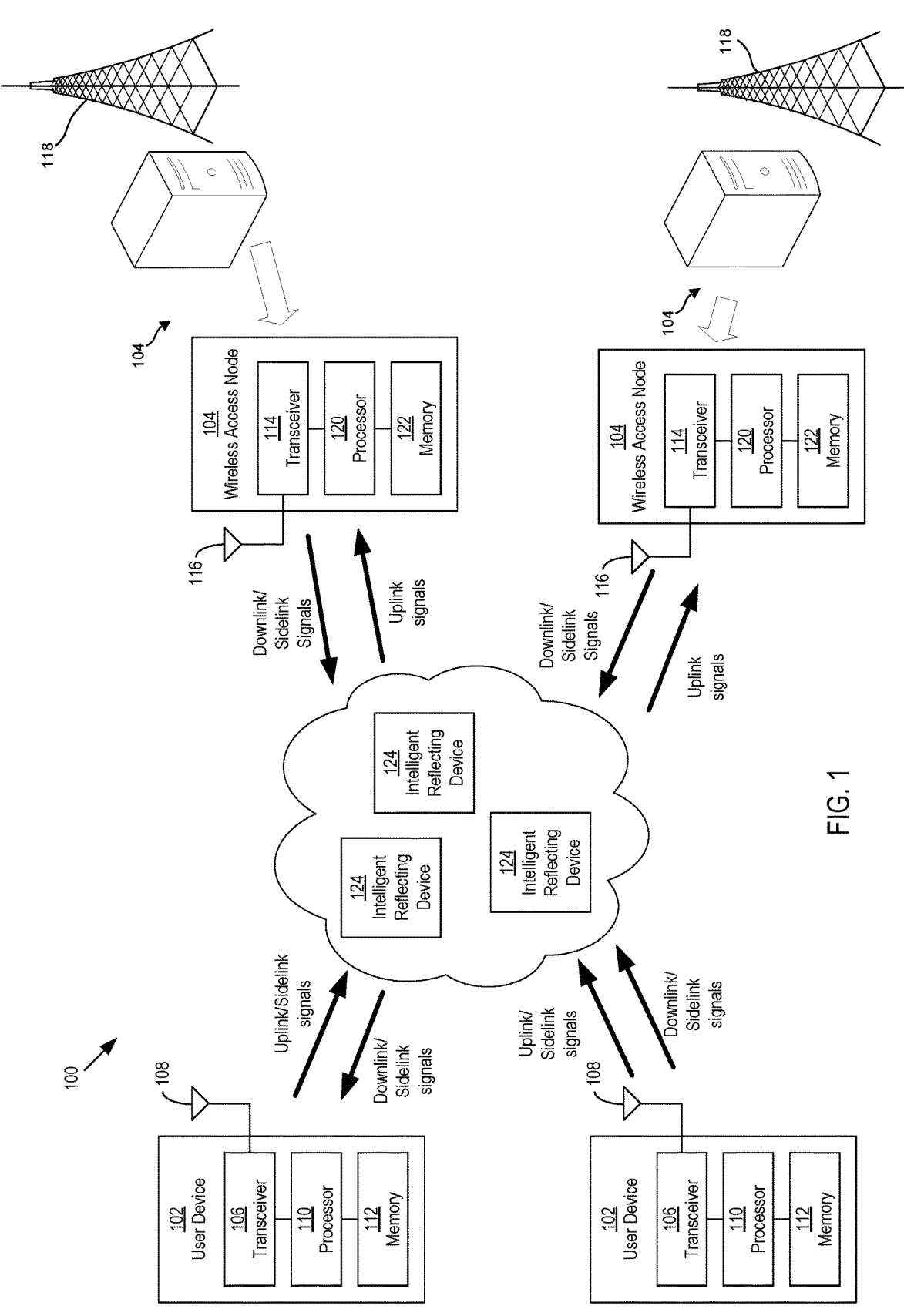
FIG. 1 shows a block diagram of an example of a wireless communication system.

FIG. 1 shows a diagram of an example wireless communication system 100 including a plurality of communication nodes (or just nodes) that are configured to wirelessly communicate with each other. In general, the communication nodes include at least one user device 102 and at least one wireless access node 104. The example wireless communication system 100 in FIG. 1 is shown as including two user devices 102 and two wireless access nodes 104. However, various other examples of the wireless communication system 100 that include any of various combinations of user devices 102 and wireless access nodes 104, including only one user device 102 and only one wireless access node 104, only one user device 102 and two or more wireless access nodes 104, two or more user devices 102 without any wireless access nodes 104, two or more user devices 102 and one or more wireless access nodes 104, or two or more wireless access nodes 104 without any user devices 102.

The user device 102 may include a single electronic device or apparatus, or multiple (e.g., a network of) electronic devices or apparatuses, capable of communicating wirelessly over a network. A user device may comprise or otherwise be referred to as a user terminal or a user equipment (UE). Additionally, a user device may be or include, but not limited to, a mobile device (such as a mobile phone, a smart phone, a tablet, or a laptop computer, as non-limiting examples) or a fixed or stationary device, (such as a desktop computer or other computing device that is not ordinarily moved for long periods of time, such as appliances, other relatively heavy devices including Internet of things (IOT), or computing devices used in commercial or industrial environments, as non-limiting examples). In various embodiments, a user device 102 may include transceiver circuitry 106 coupled to an antenna 108 to effect wireless communication with the wireless access node 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Similarly, a wireless access node 104 may also include a single electronic device or apparatus, or multiple (e.g., a network of) electronic devices or apparatuses, and may comprise one or more base stations or other wireless network access points capable of communicating wirelessly over a network with one or more user devices and/or with one or more other wireless access nodes 104. For example, the wireless access node 104 may comprise a 4G LTE base station, a 5G NR base station, a 5G central-unit base station, a 5G distributed-unit base station, a next generation Node B (gNB), an enhanced Node B (eNB), or other similar or next-generation (e.g., 6G) base stations, in various embodiments. A wireless access node 104 may include transceiver circuitry 114 coupled to an antenna 116, which may include an antenna tower 118 in various approaches, to effect wireless communication with the user device 102 or another wireless access node 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement one or more of the methods described herein.

In various embodiments, two communication nodes in the wireless system 100—such as a user device 102 and a wireless access node 104, two user devices 102 without a wireless access node 104, or two wireless access nodes 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which, in various embodiments, may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

In the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a sending node or a sending device, the second node may be referred to as a receiving node or a receiving device, and the communication may be considered a transmission for the first node and a reception for the second node. Of course, since communication nodes in a wireless system 100 can both send and receive signals, a single communication node may be both a sending node and a receiving node simultaneously or switch between being a sending node and a receiving node.

Also, particular signals can be characterized or defined as either an uplink (UL) signal, a downlink (DL) signal, or a sidelink (SL) signal. An uplink signal is a signal transmitted from a user device 102 to a wireless access node 104. A downlink signal is a signal transmitted from a wireless access node 104 to a mobile station 102. A sidelink signal is a signal transmitted from a first user device 102 to a second user device 102, or a signal transmitted from a first wireless access node 104 to a second wireless access node 104.

In addition, the wireless communication system 100 may further include, or be in communication with, a network of one or more intelligent reflecting devices 124. As used herein, an intelligent reflecting device is a device having a surface that can reflect a signal, and that has one or more variable reflection angles. An intelligent reflecting device, and/or the intelligent reflecting device's surface, may also, or otherwise, be referred to as an intelligent reflecting surface (IRS), a large intelligent surface (LIS), a large intelligent metasurface (LIM), smart reflect-arrays, a reconfigurable intelligent surface (RIS), a software-defined surface (SDS), a software-defined metasurface (SDM), a passive intelligent surface (PIS), or passive intelligent mirrors.

In general, a surface of an intelligent reflecting device receives an incident signal and reflects the incident signal. The signal that the surface outputs in response to, or as a result of, the reflection is referred to as a reflected signal. In other words, a reflected signal is a reflected version of an incident signal reflected by a surface.

In addition, a surface of an intelligent reflecting device may be configured to reflect signals with one or more variable reflection angles. A reflection angle is an angle at which a surface outputs a reflected signal. A reflection angle may be determined or measured relative to the surface of the intelligent reflecting device, or a line perpendicular to the surface. Additionally, a variable reflection angle is a reflection angle that has an amount or value that can vary over time. Accordingly, at any time, an intelligent reflecting device can change, or keep the same, the amount of the reflection angle.

Also, in various embodiments, an intelligent reflecting device may simultaneously reflect multiple signals, each with a respective one of multiple variable reflection signals. In various embodiments, a surface of an intelligent reflecting device may be separated or divided into multiple portions or regions. Each region may be configured to reflect an incident signal with an associated variable reflection angle. At any given time, different regions may reflect incident signals with associated variable reflection angles that are the same as or different from each other. The intelligent reflecting device may be configured to independently control or set the variable reflection angles of the different regions at various times.

In addition, for at least some embodiments, a surface of an intelligent reflecting device may be configured to reflect an incident signal with a variable reflection magnitude. In general, a reflection magnitude is or indicates an amount of power of the incident signal that the surface reflects. The reflection magnitude may be a value in units of power (such as Watts), or may be represented as a percentage or a fraction of the power of the incident signal. The reflection magnitude may be inversely related to an amount of energy of a signal that the surface absorbs upon receipt and reflection of the signal. Also, a variable reflection magnitude is a reflection magnitude that has an amount or value that can vary over time. Accordingly, at any time, an intelligent reflecting device can change, or keep the same, the amount of the reflection magnitude.

Also, in various embodiments, an intelligent reflecting device may simultaneously reflect multiple signals, each with a respective one of multiple reflection magnitudes. In particular, each region of multiple regions of a surface of an intelligent reflecting device may reflect an incident signal with an associated variable reflection magnitude. At any given time, the different regions may reflect incident signals with associated variable reflection magnitudes that are the same as or different from each other. The intelligent reflecting device may be configured to independently control or set the variable reflection magnitudes of the different regions at various times.

Figures 2A, 2B, 2C:
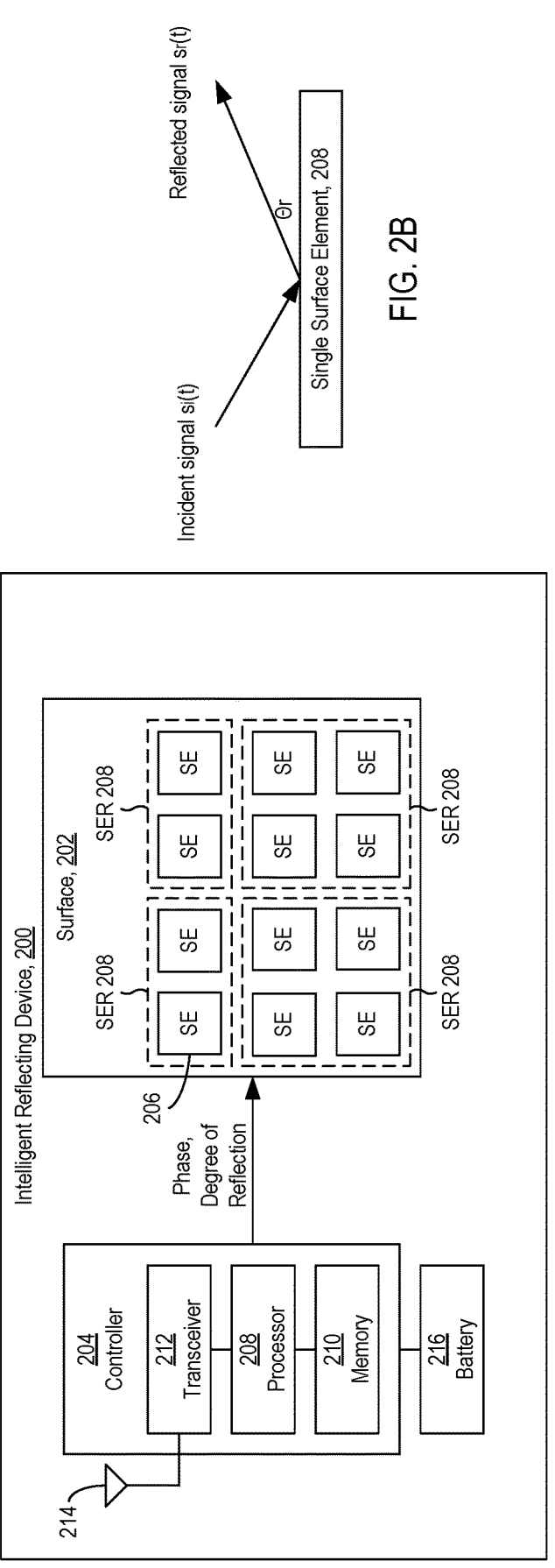
FIG. 2A shows a block diagram of an example intelligent reflecting device.
FIG. 2B shows a diagram of a surface of an intelligent reflecting device reflecting an incident signal.
FIG. 2C shows a diagram of a surface reflecting with multiple reflection angles.

In further detail, FIG. 2A shows a block diagram of an example configuration of an intelligent reflecting device 200, which is representative of an example configuration of an intelligent reflecting device 124 in FIG. 1. The intelligent reflecting device 200 includes a surface 202 and a controller 204. The surface 202 includes a plurality of surface elements (SE) (also called surface units (SU)) 206. For simplicity, FIG. 2A shows twelve surface elements 206. However, any numbers of surface elements 206 are possible in any of various embodiments, including numbers in the hundreds, thousands, tens of thousands, or higher. In general, a surface element 206 of the surface 202 of the intelligent reflecting device 200 is a smallest unit or portion of the surface having an associated variable reflection angle. Accordingly, the intelligent reflecting device 200 may be configured such that any two surface elements 206 may have their respective variable reflection angles set or controlled independent of each other.

Also, each surface element 206 may have an associated variable phase shift with which it reflects an incident signal. The amount of phase shift may in turn determine the amount of the reflection angle. Accordingly, the intelligent reflecting device 200 may set the associated phase shift of a given surface element 206 to a certain amount in order to effect a certain amount of reflection angle associated with the given surface element 206. In addition, the intelligent reflecting device 200 may change the phase shift from one amount to a second amount in order to effect a corresponding change of the reflection angle.

Additionally, each surface element 206 may have an associated variable reflection magnitude. The intelligent reflecting device 200 may set an associate variable reflection magnitude of a given surface element 206 to a certain amount in order to effect a certain power of an incident signal that the given surface element 206 reflects. In some embodiments, each surface element 206 is configurable in two different states to provide a variable reflection magnitude, including a first stage where a given surface element 206 reflects a maximum amount of power it is capable of reflecting, and a second state where the given surface element 206 reflects a minimum amount of power (or absorbs a maximum amount of power) that is capable of reflecting. In other configurations, a given surface element 206 can be configured in more than two different states in order to reflect one or more amounts of power in between maximum and minimum levels.

In addition, the surface elements 206 may have any of various constructions in order to have variable phase shifts, reflection angles, and/or reflection magnitudes, including but not limited to PIN diodes, micro-electromechanical systems (MEMS), varactor diodes, graphene, liquid crystal, temperature-sensitive devices, and/or photosensitive devices. The material, arrangement, size, internal, and states of the surface elements 206 may affect the service capability of the intelligent reflecting device 200 for different frequency bands.

Also, the surface elements 206 of the surface element 202 may be divided, separated, or grouped together into one or more surface element regions (SER) 208. In general, a surface element region is a group or a set of one or more surface elements 206. For purposes of illustration, FIG. 2A shows four surface element regions 208, although in any of various embodiments, the surface 202 can have its surface elements 206 divided into any number of one or more surface regions 208. Also, for at least some embodiments, one surface element 208 may be in only one surface element region 208 at any given point in time.

Additionally, in some embodiments, a surface element region 208 is fixed, i.e., the one or more surface elements that form the surface element region 208 is constant or unchangeable. In other embodiments, a surface element region 208 is variable or configurable. That is, a combination of one or more surface elements 206 can change at different points in time. In turn, the numbers, shapes, and/or sizes of surface element regions 208 of the surface 202 may change at different points in time. For example, FIG. 2A shows four surface element regions 208, including two surface element regions 208 each with two surface elements 206, and two surface element regions 208 each with four surface elements 206. At another point in time, the intelligent reflecting device 200 may divide the twelve surface elements 206 into two surface element regions 208 each with six surface elements 206, or may divide the twelve surface elements 206 into two surface element regions 208 but with unequal numbers, or may keep group all of the twelve surface elements 206 into one surface element region 208, as non-limiting examples. Also, in various embodiments, and/or at any of various times, a given surface element 206 may not be part of any surface element region 206.

In addition, surface elements 206 may be assigned to a given surface element region to configure the given surface element region with a particular shape, size, and/or for the surface element region to have a particular position or cover a certain area of the surface 202. Any of various shapes that can be formed with one or more surface elements 206 of the surface 202 may be possible, such as rectangular or polygonal, star-shaped, elliptical, amorphous, or any other type of shape. Also, a size of a given surface element region may depend on, or be equal to, a number of surface elements 206 of the given surface element region. Accordingly, at any of various times where the surface element regions 206 are divided into multiple surface element regions, any two surface element regions may have the same as or different sizes and/or shapes from each other. Additionally, in various embodiments, a given surface element region may be contiguous or non-contiguous (e.g., a given surface region includes two or more portions that are unconnected with each other). In various embodiments or at any of various times, the surface element regions of the surface may all be contiguous, may all be non-contiguous, or may a combination of contiguous and non-contiguous.

In general, each surface element region 208 may have an associated variable reflection angle and/or associated variable reflection magnitudes, and the intelligent reflecting device 200 may be configured to independently set, control, and/or change the variable reflection angles and/or magnitudes for each of the surface element regions 208. Accordingly, the intelligent reflecting device 200 may independently determine reflection angles and/or magnitudes for the different surface element regions 208, and in turn, set the phase shifts and/or states of the different surface elements 206 of the different surface element regions 208 in order for the different surface element regions 208 to be configured to reflect, including simultaneously reflect, respective incident signals with their respective reflecting angles.

As one example illustration, FIG. 2B shows the surface 202 with its surface elements configured as a single surface element region 208 that reflects an incident signal $s_i(t)$ to output a reflected signal $s_r(t)$ at a reflection angle $\Theta_r$. The intelligent reflecting device 200 may determine an amount of the reflection angle $\Theta_r$, and in turn set the phase shifts of the surface elements 206 that are part of the single surface element region 208 so that the single surface element region 208 outputs the reflected signal $s_r(t)$ with the reflection angle $\Theta_r$ at the determined amount.

As another example illustration, FIG. 2C shows the surface 202 with its surface elements configured as two surface element regions 208(1) and 208(2). The intelligent reflecting device 200 may independently determine amounts for a first reflection angle $\Theta_{r1}$ for the first surface region 208(1) and for a second reflection angle $\Theta_{r2}$ for the second surface region 208(2). In turn, the intelligent reflecting device 200 may set phase shifts for the surface elements 206 in the first and second surface element regions 208(1), 208(2) so that the first surface element region 208(1) reflects a first incident signal $s_{i1}(t)$ and outputs a first reflected signal $s_{r1}(t)$ at the first reflection angle $\Theta_{r1}$, and the second surface element region 208(2) reflects a second incident signal $s_{i2}(t)$ and outputs a second reflected signal $s_{r2}(t)$ at the second reflection angle $\Theta_{r1}$.

Referring back to FIG. 2A, in general, the controller 204 is configured to control the surface 202 and the surface elements 206. As part of its control functionality, the controller 204 may configured to perform any of various functions and/or make any of various determinations in order for the surface elements 204 to reflect with certain reflection angles. As examples, the controller 204 may determine surface element regions 208, and determine which surface element region 208 to which each of the surface elements 206 belongs, and/or assign each surface element 206 to a surface element region 208. In addition or alternatively, the controller 204 determines reflection angles for each of the surface element regions 208, and is configured to set the phase shifts of the surface elements 206 so that the surface element regions 208 reflect according to the determined reflection angles. Additionally, the controller 204 may control the surface 202 and/or the surface elements 206 to control the reflection magnitudes according to which the surface elements 206 reflect incident signals. Also, in various embodiments, the controller 204 may be configured to determine and/or set any of various communication parameters associated with receiving incident signals and/or outputting reflected signals for communication between other nodes in the wireless communication system 100. As non-limiting examples, the controller 204 may be configured to determine channel state information and/or received signal power related to incident signals that the intelligent reflecting device 200 receives and/or reflected signals that the intelligent reflecting device 200 outputs. Additional functionality associated with the controller 204 is described in further detail below.

Similar to the communication nodes in FIG. 1, the controller 204 may include a processor 208 and a memory (or other storage device) 210. In various embodiments, the memory 210 may store therein instructions or code that, when read and executed by the processor 208, cause the processor 208 to perform any of various functions and/or any of various methods described herein.

Additionally, for at least some example configurations, the controller 204 includes transceiver circuitry 212 configured to communicate, including sending and receiving, signals and/or information with one or more other communication nodes in the wireless communication system 100. For some example embodiments, such as shown in FIG. 2A, the intelligent reflecting device 200 includes an antenna 214 coupled to the transceiver 212 through which the intelligent reflecting device 200 wirelessly communicates with the other communication nodes. In addition or alternatively, the intelligent reflecting device 200, by way of the transceiver 212, may be configured to communicate with one or more other communication nodes through one or more wired connections, such as with electrical wires or cabling electrically connecting the intelligent reflecting device 200 with the one or more other communication nodes. Accordingly, in various embodiments, the intelligent reflecting device 200 can externally communicate with one or more communication nodes, wirelessly, though wired connections, or a combination thereof.

Referring generally to FIGS. 1 and 2A-2C, in various embodiments, the surface elements 206 are passive. As a result, the surface elements 206 interact with electromagnetic waves in the environment by passive reflection or transmission so that the intelligent reflecting device 200 can operate in full frequency bands. While such full-band characteristics are generally advantageous, they may also make it challenging to distinguish or separate signals of different frequencies. As different telecom operators, different base stations (wireless access nodes), and/or different user equipment devices (UEs) may communicate signals with different frequencies, it may be challenging to use an intelligent reflecting device 200 with or for multiple, different telecom operators, base stations, and/or UEs. To illustrate, when building and deploying networks, different telecom operators may deploy their own intelligent reflecting devices 124/200 in different locations and have the rights to use and communicate with their intelligent reflecting devices 124/200 through their allocated frequency bands. However, in practice, signals transmitted by other telecom operators in different frequency bands will also reach the intelligent reflecting device 124/200 through environmental reflection, scattering, and/or diffraction. As such, it may be difficult to distinguish among signals from different telecom operators and/or to use an intelligent reflecting device 124/200 for only the telecom operator with the use rights. In addition or alternatively, it may be difficult to distinguish users (user devices) that communicate at different frequencies and/or use intelligent reflecting devices for targeted services.

Figure 3:
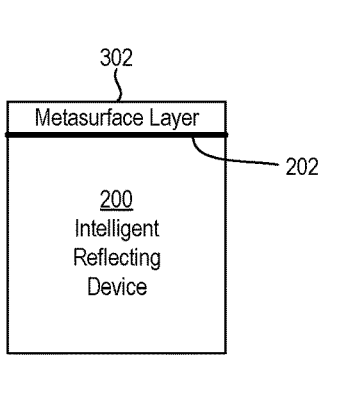
FIG. 3 shows a diagram of an intelligent reflecting device with a metasurface layer.

FIG. 3 shows an example system 300 that includes the intelligent reflecting device 200 integrated with a metasurface layer 302. As shown in FIG. 3, the metasurface layer 302 may be disposed over or cover the surface 202 of the intelligent reflecting device 200. The combination of the intelligent reflecting device 200 and the metasurface layer 302 in FIG. 3 may also or alternatively be representative of at least one of the intelligent reflecting devices 124 in the system 100 of FIG. 1.

In general, the metasurface layer 302 is a two-dimensional or planar structure configured to filter electromagnetic signals wirelessly communicated in a wireless communication system, such as the system 100 of FIG. 1. By covering the surface 202, the metasurface layer 302 may be configured filter incoming or incident signals and/or outgoing signals of the intelligent reflecting device 200. By filtering incoming signals, the metasurface layer 302 may filter a signal before it is received or reflected by the surface 202 of the intelligent reflecting device 200. By filtering outgoing signals, the metasurface layer 302 may filter an output signal transmitted or reflected by the surface 202 before the output signal reaches another node in the communication system 100.

In various embodiments, an intelligent reflecting device 200 may be configured to operate in at least one of two different modes, including a reflection mode and a transmission mode. In the reflection mode, the surface 202 merely reflects (including passively reflects) incoming or incident signals to output reflected signals. Accordingly, for an intelligent reflecting device 200 in the reflection mode, in combination with the metasurface layer 302 as shown in FIG. 3, the metasurface layer 302 effectively filters a signal twice before the signal is communicated to another communication node. That is, the metasurface layer 302 receives an incoming signal and filters the incoming signal (a first time) to generate a filtered incoming signal. The filtered incoming signal is reflected by the surface 202 of the intelligent reflecting device 200 to output a reflected filtered signal back to the metasurface layer 302. The metasurface layer 302 filters the reflected signal (effectively filtering the incoming signal a second time) to output a filtered reflected signal to another communication node.

Additionally, in the transmission mode, the intelligent reflecting device 200 includes active components (e.g., an amplifier or other transmitter circuitry) to generate and output a signal. The output signal is not one that is merely passively reflected. Accordingly, for an intelligent reflecting device 200 in the transmission mode, in combination with the metasurface layer 302, the metasurface layer 302 effectively filters a signal only once before the signal is communicated to another communication node. Without any reflecting, the intelligent reflecting device 200 generates an outputs a signal with active circuit components, and the metasurface layer 302 filters the output signal to output a filtered signal to another communication node.

Figure 4A:
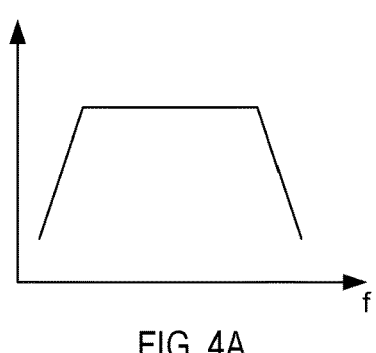
FIG. 4A shows a band-pass filter configuration for at least one metasurface layer.
Figure 4B:
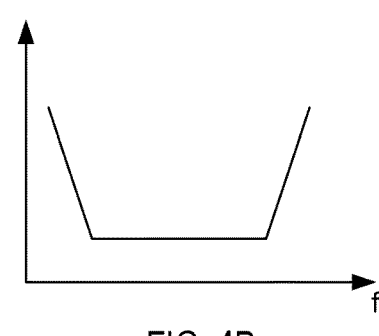
FIG. 4B shows a band-stop filter configuration for at least one metasurface layer.
Figure 4C:
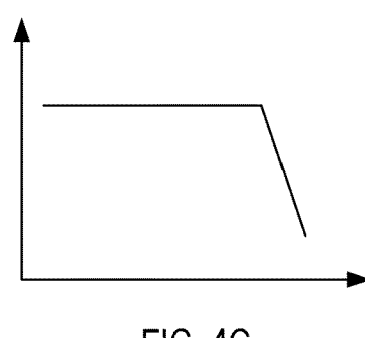
FIG. 4C shows a low-pass filter configuration for at least one metasurface layer.
Figure 4D:
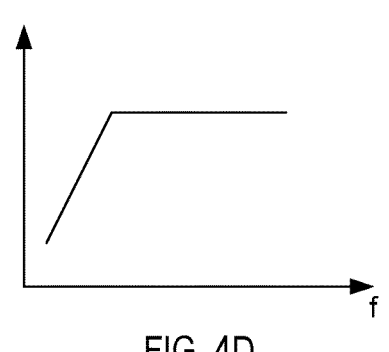
FIG. 4D shows a high-pass filter configuration for at least one metasurface layer.

Additionally, the metasurface layer 302 may be configured to configure a signal according to one or more filter configurations. In general, a filter configuration is a configuration that determines how a metasurface layer filters a signal that the metasurface layer receives. A filter configuration may indicate how a metasurface layer responds or reacts to frequency components of signals, including how much the metasurface layer attenuates or suppresses signal power as a function of frequency. A filter configuration may have any of various filter types, including a band-pass filter (FIG. 4A), a band-stop filter (FIG. 4B), a low-pass filter (FIG. 4C), or a high-pass filter (FIG. 4D). Additionally, a filter configuration may have or indicate any of various properties of a filter, such as upper and/or lower cutoff frequencies, a center frequency, a bandwidth, or a transfer function, as non-limiting examples.

Figure 5:
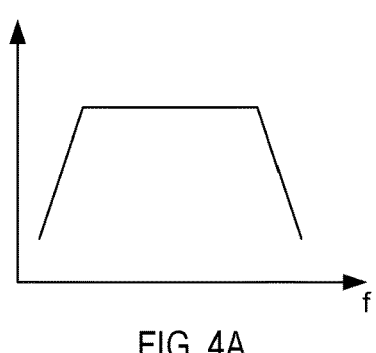
FIG. 5 shows a diagram of a configuration of a metasurface layer with elements and a controller.

Referring to FIG. 5, a metasurface layer 302 may include a plurality of metasurface layer elements (ME) 502. FIG. 5 shows the metasurface layer elements 502 configured in a two-dimensional array or matrix, although other configurations may be possible. Each metasurface layer element 502 may be made of an electromagnetic metamaterial and/or passive material, such as switching diodes or other tunable materials, that has an associated variable impedance. Similar to the surface elements 206 of the intelligent reflecting device 200, the metasurface layer elements 502 may each be configured one of a plurality states. For example, each metasurface layer element may be configurable in one of two states including a State 0 and a State 1. Each state may have an associated impedance. The impedance of a metasurface layer element 502 may determine how the metasurface layer element 502 responds to electromagnetic wave characteristics of a signal, and a metasurface layer element 502 responds differently to the electromagnetic wave characteristics in different states. Accordingly, the respective states of a collection or group of metasurface layer elements 502 may determine how the group filters a received signal.

Further, as used herein, a metasurface layer element group comprises one or more metasurface layer elements of a metasurface layer. In some forms, a metasurface layer element group may include all of the metasurface layer elements 502 of a metasurface layer 302, in which case the metasurface layer 302 has only one metasurface layer element group and/or the metasurface layer elements 502 of a metasurface layer 302 are all part of or grouped into the same metasurface layer element group. In other forms, the metasurface layer 302 may include multiple metasurface layer element groups. That is, the metasurface layer elements 502 of a metasurface layer 302 are grouped or divided into multiple or a plurality of metasurface layer element groups, where each metasurface layer element 502 is grouped into or part of a respective one of the plurality of metasurface layer element groups. Also, in some embodiments, the metasurface layer element grouping of a metasurface layer 302 is static, in that the metasurface layer element group that each metasurface layer element 502 is in is fixed or does not change. In other embodiments, the metasurface layer element grouping of a metasurface layer 302 is dynamic, in that the metasurface layer element grouping can change and be different at different points in time. In various embodiments, a metasurface layer element grouping may change if at least one metasurface layer element 502 is part of a different metasurface layer element group in a current metasurface layer element grouping than it was in a prior metasurface layer element grouping.

A given metasurface layer element group may have an associated state configuration, which indicates a respective state for each metasurface layer element 502 in the given metasurface layer element group. Additionally, a state configuration may have an associated filter configuration. In turn, a given metasurface layer element group may filter a received signal according to a filter configuration when configured in the state configuration that is associated with the filter configuration.

In various embodiments where the metasurface layer 302 includes multiple metasurface layer element groups, at any given point in time, two different metasurface layer element groups can be configured in the same state configuration associated with the same associated filter configuration as each other, or in different state configurations associated with different filter configurations from each other. Accordingly, at a given point in time, two different metasurface layer element groups may filter a received signal the same as or different from each other, dependent on their respective state configurations.

Additionally, in various embodiments, a metasurface layer 302 is non-tunable or tunable. For a non-tunable metasurface layer 302, the state of each metasurface layer element 502 is fixed. That is, the state of each metasurface layer element 502 may be set at an initial time, such as during manufacturing, and thereafter the states do not change. Correspondingly, a non-tunable metasurface layer 302 may provide a fixed filtering function. In other embodiments, a metasurface layer 302 is tunable. For a tunable metasurface layer 302, the state of each metasurface layer element 502 is variable. That is, the state of each metasurface layer element 502 can be adjusted or changed at various points in time, including various points of time during operation, such as when the metasurface layer 302 is covering a surface 202 of an intelligent reflecting device 200, and/or while and/or between periods that the metasurface layer 302 is filtering signals being communicated between the intelligent reflecting device 200 and communication nodes 102, 104 in the wireless communication system 200. Correspondingly, a tunable metasurface layer 302 may provide a dynamic or variable filtering function. In various other embodiments, a metasurface layer 302 may be a combination or hybrid of tunable and non-tunable, in that the states of some metasurface layer elements 502 may be fixed, while the states of other metasurface layer elements 502 may be variable. For clarity, as used herein, a metasurface layer 302 is tunable if the state of at least one of its metasurface layer elements 502 is variable.

Also, as shown in FIG. 5, the metasurface layer 302 may include, or otherwise be electrically coupled to, a controller 504 (which may be configured in hardware or a combination of hardware and software, such as by having a hardware processor and/or a memory). In various embodiments, the controller 504 may be the same as, or at least part of, the controller 204 of the intelligent reflecting device 200. In other embodiments, the controllers 204 and 504 may be separate components.

In addition, the controller 504 may be configured to set, adjust, and/or change the states for each of the metasurface layer elements 502. For example, the controller 504 may be configured to determine a state configuration for a metasurface layer group and configure the metasurface layer elements 502 of the metasurface layer group in respective states corresponding to the state configuration. Also, for configurations where the metasurface layer element groups are dynamic, the controller 504 may be configured to change the grouping at any of various points in time. For at least some embodiments, the controller 504 may be used or be present for only tunable metasurface layers 302.

Figure 6:
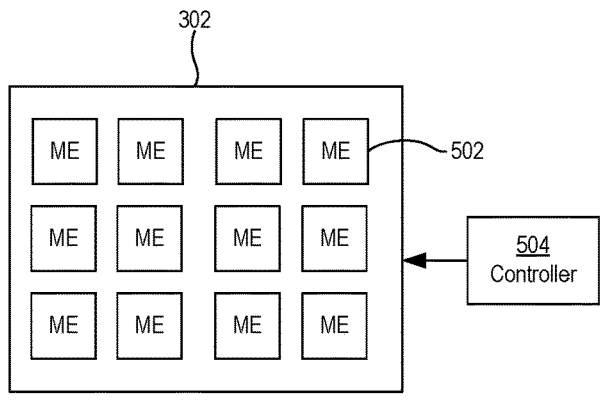
FIG. 6 shows a diagram of an intelligent reflecting device with a stack of metasurface layers.

FIG. 6 show another configuration for an intelligent reflecting device that includes a stack 600 of a plurality or an N-number of metasurface layers 602 disposed over or covering a surface 202 of an intelligent reflecting device 200, where N is an integer of two or more. The N-number of metasurface layers 602 may be stacked on top of each other, with a first metasurface layer 602(1) closest to the surface 202 of the intelligent reflecting device 200, and an Nth metasurface layer 602(N) furthest away from the surface 202 of the intelligent reflecting device 200. Each ith metasurface layer 602($i$) may be configured to filter signals, as previously described for the metasurface layer 302 of FIG. 2. In addition, each ith metasurface layer 602($i$) have its own set of metasurface layer elements 502 (such as shown in FIG. 5), configurable in one more metasurface layer element groups, with each group configurable in one more state configurations corresponding to an associated filter configuration. Also, each metasurface layer 602 may be tunable or non-tunable, as previously described. In various embodiments, each metasurface layer 602, such as each tunable metasurface layer 602, may have its own controller (such as controller 504 of FIG. 5). In other embodiments, one controller is configured to control multiple metasurface layers 602.

Different metasurface layers 602 may be configured to filter a signal in a same way or different ways in any of various embodiments or at any of different times. For example, different metasurface layers groups in different metasurface layers 602 may have the same or different state configurations as each other at any of different points in time. The controller 504 may be configured to set, change, and/or adjust the state configurations of the metasurface layer groups of the stack 600.

Additionally, for incoming signals, each metasurface layer 602 may filter an incoming signal. Accordingly, an incoming signal is filtered an N-number of times by the stack 600 before it reaches, or is received and/or reflected by the surface 202 of the intelligent reflecting device 200. Similarly, an outgoing signal (one that is reflected by the surface 202 in the reflection mode or actively generated transmitted in the transmission mode) is filtered an N-number of times by the stack 600 before being communicated to another communication node.

Also, in various embodiments, the filter configurations of the different metasurface layers 602 and/or metasurface layer element groups of the different layers 602, may provide an overall filter configuration of the stack 600, such that the stack 600 generally filters an incoming signal or an outgoing signal according to the overall filter configuration. For simplicity, unless expressly stated otherwise, the present description describes an intelligent reflecting device implemented with at least one metasurface layer covering a surface of the intelligent reflecting device, where the at least one metasurface layer is either a single metasurface layer (such as the metasurface layer 302 of FIG. 3) or a stack of multiple metasurface layers (such as the stack 600 of metasurface layers 602 of FIG. 6). The at least one metasurface layer may be configured with a filter configuration. For embodiments where the at least one metasurface layer includes only one metasurface layer, the filter configuration may include, correspond to, or refer to only one filter configuration for the metasurface layer elements of the metasurface layer, or include, correspond to, or refer to multiple filter configurations for multiple metasurface layer element groups of the metasurface layer. Additionally, for embodiments where the at least one metasurface layer includes a stack of multiple metasurface layers, the filter configuration may include, correspond to, or refer to only one filter configuration for the stack, or include, correspond to, or refer to multiple filter configurations for multiple metasurface layer element groups of metasurface layer elements in the different metasurface layers. Further, in various embodiments, the filter configuration can be static or dynamic. For a static filter configuration for a given metasurface layer element group, the group filters signals the same way over time according to the static filter configuration. For a dynamic filter configuration for a given metasurface layer element group, the group may be configured to filter signals in different ways according to different filter configurations at different points in time.

Also, in various embodiments, the at least one metasurface layer may have a filter configuration that allows a certain target frequency band of signals to pass. In turn, the filter configuration may cause the at least one metasurface layer to suppress or reject signals with frequencies outside of the frequency band. For embodiments where the at least one metasurface layer includes only one metasurface layer, the filter configuration may have the target frequency band. For embodiments where the at least one metasurface layer include multiple metasurface layers, each filter configuration for each metasurface layer may have the target frequency band, or the target frequency band may be divided into sections, where filter configuration has one of the sections Additionally, in various embodiments, a filter configuration may be determined by any of various communication nodes in the wireless communication system 100, including a wireless access node 104, a user device 102, an intelligent reflecting device 200, or a controller 504 of a metasurface layer. In particular embodiments, a wireless access node 104 measures a channel using an intelligent reflecting device having at least one metasurface layer, and in response to the channel measurement, may determine a beamforming matrix, and at least one of a first matrix for the intelligent reflecting device or a second matrix for the at least one metasurface layer. In various embodiments, the wireless access node 104 may determine a combined matrix for a combination of the intelligent reflecting device and the at least one metasurface layer. A filter configuration for the at least one metasurface layer may correspond to or be determined by the second matrix and/or the combined matrix. Upon determination of the first matrix, the second matrix, and the combined matrix, the wireless access node 104 may communicate one or more of the matrices to the intelligent reflecting device 200 and/or the controller 504, such as wirelessly or though a wired connection. In various embodiments, the controller 504 may set a state configuration for the at least one metasurface layer according to the second matrix and/or the combined matrix.

In addition or alternatively, the controller 504 may set and/or change a state configuration or a filter configuration for the least one metasurface layer based on any of various criteria, such as but limited to fixed time intervals, statistical information, environmental changes, UE movement, and/or deployment location. In some embodiments, when user devices 102 accessing the system 200 communicate in the same frequency band (such as working in the sub-6G frequency band), the controller 504 may set or adjust the filter configuration and/or state configuration for the at least one metasurface layer at fixed intervals. Additionally, in some embodiments when user devices 102 accessing the system 100 are communicating in different frequency bands (e.g., one more user devices 102 are communicating in sub-6G frequency bands and one more other user devices 102 are communicating in millimeter-wave frequency bands), the controller 504 may set or adjust the filter configuration according to a user frequency range in a serving cell. In the event that a wireless access node 104 detects a significant change in user attributes in a cell, the wireless access node 104 may re-allocate resources and cause a filter configuration of the at least one metasurface layer to be adjusted. In addition or alternatively, the controller 504 may adjust, such as in response to instructions from a wireless access node 104, a target frequency band in proportion to a number of user devices 102 in the system 100. For example, when the number increases, the controller 504 may increase the target frequency band, and then number decreases, the controller 504 may decrease the target frequency band. In addition or alternatively, the controller 504 may adjust the target frequency band according to mobility of a user device 102 and/or environmental changes. For example, the controller 504 may increase the frequency band according to increased mobility and/or increasingly changing environment conditions, and decrease the frequency band according to decreased mobility or relatively stable environment conditions.

Additionally, in various embodiments, during a time that the controller 504 is not adjusting a filter configuration for the at least one metasurface layer, a wireless access node 104 may determine a beamforming matrix and a first matrix for the intelligent reflecting device 200 based on channel measurement information. Further, in various embodiments, during a time that the controller 504 is adjusting a filter configuration for the at least one metasurface layer, a wireless access node 104 may jointly design or determine a beamforming matrix, a first matrix for the intelligent reflecting device 200, and a second matrix for the at least one metasurface layer based on channel measurement information.

Also, in various embodiments, a controller 504 can set different filter configurations for the at least one metasurface layer to achieve effective out-of-band filtering for user devices of a target frequency band. For example, in some embodiments, an intelligent reflecting device 124/200 may be configured or designated for exclusive use with a particular one or more telecom operators. A telecom operator for which an intelligent reflecting device is exclusive may be referred to as a target operator, and a telecom operator for which an intelligent reflecting device is not exclusive may be referred to as a non-target operator. In such embodiments, the controller 504 may determine a filter configuration having a band-pass filter (e.g., FIG. 4A) for frequency band filtering of signals for a first telecom operator, and a band-stop filter (e.g., FIG. 4B) for frequency band filtering of signals for a second telecom operator. Application of both the band-pass and band-stop filters may reduce the interference of non-target operator signals sent to the intelligent reflecting device.

Also, in various embodiments, an intelligent reflecting device 200, such as with its controller 204, may be configured with sensing ability to sense one more characteristics, such as a frequency, of signals that the intelligent reflecting device 200 receives. Such embodiments may use the sensing ability to reduce interference of incident signals with different frequencies through deployment design and system control. In addition or alternatively, an intelligent reflecting device 200 with sensing ability may be configured to detect signals, and such detection may be controlled by a wireless access node 104, in any of various embodiments. In addition or alternatively, through use of sensing ability, an intelligent reflecting device 200 and/or a wireless access node 104 may be configured to select user devices 102 to serve and/or notify user devices of serving decisions, based on access identification information and/or user identification information.

Also, different processing capabilities of an intelligent reflecting device may provide any of various solutions for wireless communications involving an intelligent reflecting device configured for use with one more telecom operators. In various embodiments, including those where processing capabilities of an intelligent reflecting device is relatively strong, the intelligent reflecting device 200, such as through use of its controller 204, may be configured to directly identify or obtain telecom operator information, which may include at least one of: frequency, angle, distance, location, transmission qualify, or work demand, such as by receiving one more signals carrying the telecom operator information. In other embodiments, including those where processing capabilities of an intelligent reflecting device is relatively weak, the intelligent reflecting device 200 may be configured to reflect, transmit, or feedback signals carrying telecom operator information to a wireless access node 104. In response, the wireless access node 104 may perform signal processing on the signals carrying the telecom operator information.

Additionally, in various embodiments, an intelligent reflecting device 124/200 (with or without at least one metasurface layer) and/or a wireless access node 104, may be configured to operate in at least one of an access phase or a transmission phase. In an access phase, access identification information may be communicated. Access identification information may include information associated with at least one user device 102, including at least one of: telecom operator identification information, frequency information, location information, orientation information, angle information, cell attribution information, user type information user, or user channel information.

Also, in any of various embodiments, an intelligent reflecting device 124/200 and/or a wireless access node 104 may determine or identify a user group of at least one user device 102 of a plurality of user devices 102 to serve. In some embodiments, the intelligent reflecting device 124 decides which user devices 102 to serve, and notifies the wireless access node 104 of the decision. In other embodiments, the intelligent reflecting device 124 sends information to the wireless access node 104, and the wireless access node 104 decides the user group to serve. Whether to include a given user device 102 in a user group to serve may depend on at least one of various criteria, such as whether the given user device 102 belongs to a target (correct) telecom operator, whether the given user device 102 belongs to a particular cell, whether a communication with the given user device 102 satisfies one more predetermined conditions, whether a total number of service users satisfies one or more requirements, or whether the intelligent reflecting device 124/200 is compatible with one or more supporting services. Upon deciding which of the plurality of user devices 102 to be part of the user group to serve, the wireless access node 104 and/or the intelligent reflecting device may notify one more of the user devices 102 of the decision in the form of access permission information. Also, for embodiments where the wireless access node 104 decides the user group to serve, the wireless access node 104 may notify the intelligent reflecting device 124/200 of the decision.

Additionally, in a transmission phase, an intelligent reflecting device 124/200 may receive user identification information from one or more user devices 102, and detect the user identification information. The user identification information may include at least one of: a specific sequence, frequency information, location information, orientation information, angle information, user channel information, user type information, a user device or UE identification (ID), a permitted access sequence. Similar to the access phase, in various embodiments, the intelligent reflecting device 124 or the wireless access node 104 may determine or decide a user group of at least one user device 102 of a plurality of user devices 102 to serve in the transmission phase. For embodiments where the intelligent reflecting device 124 makes the decision, the intelligent reflecting device 124 may notify the wireless access node 104 of the decision. In various embodiments, whether to include a given user device 102 in the user group may depend on any of various decision conditions, including at least one of: whether the user identification information of an accessed user device 102 is detected, whether an identification or characteristic mark sequence of an accessed user device 102 is detected, whether a channel of the user device 102 accessing the network is experiencing a detectable change, whether a location of the user device 102 accessing the network has changed by a predetermined or threshold amount, or whether a number of user devices 102 accessing the network meets one more predetermined restriction conditions. If the intelligent reflecting device 124 or the wireless access node 104 determines identifies a given user device 102 as part of a user group, the intelligent reflecting device 124 or wireless access node 104 may identify the given user device 102 as transmission permitted, and the intelligent reflecting device 124 may determine to serve the given user device 102. On the other hand, if the intelligent reflecting device 124 or wireless access node 104 determines to identify a given user device 102 as not part of a user group, the intelligent reflecting device 124 or wireless access node 104 may identify the given user device 102 as transmission non-permitted, and in response, the intelligent reflecting device 124 may stop service to the given user device 102 and the given user device 102 may enter an idle state.

Also, in various embodiments, information about a user device 102 may be determined through channel measurements, and such information may be used to distinguish user devices 102 that communicate in different frequencies bands. In some embodiments, an intelligent reflecting device 124 may initially assume or determine that all user devices 102 have access to the network. Thereafter, the intelligent reflecting device 124 may receive and/or detect one or more signals, and perform signal processing to identify information carried by the one or more signals, where the information includes at least one of frequency information, location information, distance information, orientation information, signal strength information, user type information, or service quality information. Based on the information, the intelligent reflecting device 124 determines a user group of at least one user device 102 to serve. In other embodiments, the intelligent reflecting device 124 outputs the information to a wireless access node 104, which determines the user group. If a given user device 102 is part of the user group, the wireless access node 104 may send a signal to the given user device 102 that causes the given user device 102 to transmit information. On the other hand, if a given user device 102 is denied from being part of the user group, the wireless access node 104 sends a signal to the given user device 102 that informs the user device 102 to interrupt signal transmission.

Actual hardware design of an intelligent reflecting device 124 may limit the full-band access characteristics of the intelligent reflecting device 124, and different unit arrangements, sizes, intervals, and states may affect the service capabilities of the intelligent reflecting device 124 for different frequency bands. For example, an intelligent reflecting device 124 may have relative better gain (<1) performance in some specific frequency bands and relatively poor gain performance in other frequency bands. In general, the wider spectrum range, the greater the likelihood that the gain for different frequency bands will be different. When an intelligent reflecting device 124 wants to serve a user group of one or more user devices 102 in specific frequency bands, the intelligent reflecting device 124 may be configured to change a target or service frequency band according to a target frequency, the intelligent reflecting device 124 may change the configuration of its surface 202, including the states and/or material of the surface elements 206 (e.g., PIN diode, MEMS, varactor diode, liquid crystal), arrangement of the surface elements, size, and/or interval to enable the intelligent reflecting device 124 to provide better service quality to the user devices 102 being served.

In addition or alternatively, the controller 204 of the intelligent reflecting device 200 may be configured to group the surface elements 208 into segments or groups in order to form narrow beams and concurrently serve multiple user devices 102. As mentioned, the intelligent reflecting device 124/200 may receive and/or detect incident signal information of at least one user device 102, which may include any of frequency information, position information, direction information, or intensity information. The intelligent reflecting device 124/200 or a wireless access node 104 may determine a user group of at least one user device 102 to allow to access the network. In turn, the wireless access node 104 and/or the controller 204 may divide the surface elements 206 into surface element groups or blocks, with each group or block corresponding to a different one of plurality of frequencies or locations of different incident signals and/or user devices 102 in the user group to serve. The surface element groups may have any of various shapes, such as rectangular, diamond, circular, or any other type of shape. In addition or alternatively, the surface elements 206 may divided in a discrete or interleaved manner. In addition or alternatively, the numbers of surface elements 206 may depend on a number of user devices 102 in a user group to serve, channel state information, communication requirements, location information, or angle (direction) information of one or more user devices 102 in the user group. For example, the controller 204 may use a first half of the surface elements 206 to serve one or more user devices 102 of the user group that communicate according to a first frequency f1 and a second half of the surface elements 206 to serve one more user devices 102 of the user group that communicate according to a second frequency f2. In various embodiments, the wireless access node 104 may notify the intelligent reflecting device 124 of the user devices 102 in the user group and grouping information for the surface elements 206 of the surface 202. For such embodiments, the intelligent reflecting device 124 may determine, such as by communicating with the wireless access node 104, identification information of the user devices 102 with access to the network. Also, the wireless access node 104 may determine or calculate a first matrix for the intelligent reflection device 124 and sent the first matrix to the intelligent reflection device 124, such as wirelessly or via a wired connection. Upon identifying the user devices 102 with access, the first matrix, and/or the surface element groups, the intelligent reflecting device 124 may perform narrow-beam uplink transmission until it determines that transmission is not allowed.

In various embodiments, the at least one metasurface layer covering a surface 202 of an intelligent reflecting device 124/200 may filter signals according to a filter configuration that separates or filters signals with different frequencies, including filtering out undesired signals—signals with frequencies outside of a target frequency band, which in turn may reduce the amount of access identification information or transmit user information being received at the surface 202 of the intelligent reflecting device 202 and/or output to the wireless access node 104, in which turn may reduce the amount of user group decision making performed by the intelligent reflecting device 124/200 and/or speed up the user group decision-making processes.

Additionally, in various embodiments, a user device 102 may include operator identification information in one more uplink signals it transmits to an intelligent reflecting device 124 when accessing the system 100. The intelligent reflecting device 124 may detect the operator identification information to identify a telecom operators from among a plurality of telecom operators to which the user device 102 belongs.

In some embodiments, an intelligent reflecting device 124 is to exclusively serve only one telecom operator—i.e., serve only those user devices 102 operating or communicating with or according to that telecom operator. During the access process, the intelligent reflecting device 124 may perform a signal detection process by receiving signals from one more user devices 102, detecting operator identification information in received signals, and sending the detected operator identification information to a wireless access node 104. In some embodiments, the wireless access node 104 may identify one or more user devices 102 to be part of a user group to be served based on the received operator identification information and an operator identifier for the telecom operator that the intelligent reflecting device 124 is designated to exclusively serve. In other embodiments, the wireless access node 104 may identify one or more user devices 102 to be part of a user group to be served based on telecom operator information for different user devices 102 and at least one of: frequency information, angle information, distance information, location information, transmission qualify information, or work demand information of the one or more user devices 102. With this information, the wireless access node 104 may select at least part of the user devices 102 to be part of the user group for access. Accordingly, the wireless access node 104 identifies at least one user device 102 to be part of a user group to serve through communication with the intelligent reflecting device 124. Further, the wireless access node 104 may determine a scheduling result for the one or more user device 102 part of the user group, and notifies the one or more user devices 102 part of the user group that they are permitted access to the network. In general, a scheduling result may indicate a plan used by the wireless access node 104 that indicates which user devices 102 to serve, and/or how, such as a timing scheme to use, to serve them.

Also, in some embodiments where an intelligent reflecting device 124 is to exclusively serve only one telecom operator, the intelligent reflecting device 124 itself may decide which user devices 102 to be part of a user group to serve. Each intelligent reflecting device 124 may know the operator identification of the telecom operator it is to exclusively serve. Accordingly, the intelligent reflecting device 124 performs signal detection by receiving signals from one or more user devices 102, comparing operator identification information detected in the signals with its own operator identification, and determines which user devices 102 to serve or grant access based on the comparison. In various embodiments, the intelligent reflecting device 124 may also determine a scheduling result, and notify the wireless access node 104 of the scheduling result. Also, the wireless access node 104 may notify the user devices 102 of the decision on which user devices 102 to serve or whether they are permitted to access the network.

Additionally, in some embodiments, an intelligent reflecting device 124 is not configured to exclusively serve only one telecom operator. For such embodiments, during an access phase (procedure), the intelligent reflecting device 124 may receive one or more signals from one or more user device 102, and send detected operator identification information to a wireless access node 104. The wireless access node 104 may determine a scheduling result for user devices 102 configured for multiple telecom operators based on telecom operator information and at least one of frequency information, angle information, distance information, location information, transmission quality information, or work demand information. The wireless access node 104 may notify the intelligent reflecting device 124 of the scheduling result, decides which user devices 102 to be part of the user group to access the network through the intelligent reflecting device 124, and notifies the user device 102 of the decision.

Also, in the transmission phase, the intelligent reflecting device 124 may perform signal detection, where the intelligent reflecting device 124 receives and detects one or more signals from one or more user devices 102. Upon detection, the intelligent reflecting device 124 may determine if information in the signals includes user identification information of a given user device 102 granted access. If so, then the intelligent reflecting device 124 may determine to continue to maintain access for the given user device 102. Further, a wireless access node 104 may perform channel measurement, and design a first matrix for the intelligent reflecting device based on the channel measurement. In addition or alternatively, the wireless access node 104 may select a beam from a plurality of beams to communicate with a user device 102 granted access. On the other hand, if the intelligent reflecting device 124 does not detect user identification information of a given user device 102 granted access in the signal information, then the intelligent reflecting device 124 may send the information of no-access to the wireless access node 104. In response, the wireless access node 104 may terminate a communication process with the user device 102.

Additionally, in various embodiments where an intelligent reflecting device 124 is not configured to exclusively serve only one telecom operator, if a scheduling result indicates that the intelligent reflecting device 124 is not to serve a given user device 102, signal energy from the given user device 102 may be collected and converted into the energy supply of the intelligent reflecting device 124. For example, for operator-specific conditions pertaining to the intelligent reflecting device 124, when incorrect operator identification information is detected, the undesired telecom operator signals may be used for energy harvesting.

Additionally, for embodiments where an intelligent reflecting device 124/200 is configured to exclusively serve only one target telecom operator, the intelligent reflecting device 124/200 may include at least one metasurface layer covering the surface 202 of the intelligent reflecting device 124/200, as previously described. The at least one metasurface layer may have a filter configuration that filters out or rejects signals in frequency bands for non-target telecom operators. This, in turn, may suppress or reduce the probability of a signal transmitted by a user device 102 configured for a non-target telecom operator to be received, reflected, and/or output by the surface 202, which in turn may improve a probability of detecting a signal from a user device 102 configured for the telecom operator that the intelligent reflecting device 124/200 is configured to serve and/or reduce an occurrence of a false or empty detection. As mentioned, the at least one metasurface layer may be tunable or non-tunable. Further, a surface 202 of the intelligent reflecting device 124 may receive a filtered signal (i.e., a signal that passed through the at least one metasurface layer), detect information in the filtered signal, and send the detected information to a wireless access node.

In various embodiments, an intelligent reflecting device 124/200 or a wireless access node 104 may select a given user device 102 to be part of a user group to serve according to a criterion that the intelligent reflecting device is configured to serve or work for only one telecom operator. In addition or alternatively, a wireless access node 104 determines which user devices 102 to be part of a user group to serve based on a least one of: operator information, frequency information, angle information, distance information, location information, transmission quality information, or work demand information. In doing so, the wireless access node 104 may select at least one of the user devices 102 configured to the target telecom operator for access. Additionally, for embodiments where the intelligent reflecting device 124 determines which user devices 102 to be part of a user group to serve, the intelligent reflecting device 124 may notify the wireless access node 104 of its decision, which includes access user information. In response, the wireless access node 104 notifies the user devices 102 of the decision. Further, for embodiments where the at least one metasurface layer is non-tunable, the wireless access node 104 may determine a beamforming matrix and a first matrix for the intelligent reflecting device 124 based on channel measurement. Additionally, for embodiments where the at least one metasurface layer is tunable, the wireless access node 104 may determine a beamforming matrix, a first matrix for the intelligent reflecting device 124, and a second matrix for the at least one metasurface layer based on channel measurement.

Additionally, for embodiments where telecom operators have their own exclusive frequency bands, and where an intelligent reflecting device 124 is configured for non-exclusive use, i.e., configured for use with multiple telecom operators, if the intelligent reflecting device 124 detects a single signal (with a single frequency) from a given user device 102, the intelligent reflecting device 124 may directly inform a wireless access node 104, and in response, the wireless access node 104 permits access to the given user device 102. Additionally, if the intelligent reflecting device 124 detects multiple signals (with multiple frequencies) from multiple user devices 102 for different telecom operators, the intelligent reflecting device 124 may notify the wireless access node of the multiple signal/frequency detection. In response, the wireless access node 104 determines a scheduling result for the multiple user devices 102, and may select which of the user devices 102 to be part of a user group to be served based on at least one of: frequency information, direction information, intensity information, transmission quality information, or transmission requirements. For such embodiments, including where the at least one metasurface layer is tunable, the wireless access node 104 may determine a filter configuration for the at least one metasurface layer according to the frequency band or bands of the user devices permitted with access. The wireless access node 104 may send the access permission information to the user devices 102, and notify the intelligent reflecting device of the access permission information.

Also, for embodiments where telecom operators do not have their own exclusive frequency bands (i.e., they have spectrum sharing), and where an intelligent reflecting device 124 is configured for exclusive use with only one target telecom operator, frequency band information may no longer be used as a basis for distinguishing telecom operators. For such embodiments, the wireless access node 104 and/or the intelligent reflecting device 124 may determine one or more filter configurations for at least one tunable metasurface layer according to information of one or more user devices 102 permitted access. In doing so, the intelligent reflecting device 124 may detect signals from one or more user devices 102, and the intelligent reflecting device 124 or the wireless access node may compare the operator identification information of the intelligent reflecting device 124 with operator identification information in the signals to determine which user devices 102 to be part of a user group to serve. In addition or alternatively, the wireless access node 104 may determine which user devices 102 to be part of a user group to serve based on operator attribution of different user devices 102 and at least one of angle information, distance information, location information, or transmission quality information. In doing so, the wireless access node 104 may select at least one user device 102 to be part of the user group that is configured for the same telecom operator as the intelligent reflecting device 124. Additionally, all or at least some of the correct user devices 102 (i.e., those that are configured for the same telecom operator as the intelligent reflecting device 124 is configured to exclusively serve) may be determined to be part of the user group (accessed). For embodiments where the intelligent reflecting device 124 decides the user group, the intelligent reflecting device 124 may notify a wireless access node 104 of the decision. Further, the wireless access node 104 and/or the intelligent reflecting device 124 may determine a filter configuration for at least one metalayer surface having a target frequency band corresponding to the communication frequency of the user device 102 in the user group.

Also, for embodiments where the telecom operators perform spectrum sharing (the telecom operators do not have exclusive use of frequency bands), and where the intelligent reflecting device 124 is not configured for exclusive use with only one telecom operator, the intelligent reflecting device 124 may receive signals from user devices 102 and determine which of the user devices 102 to be part of a user group to serve based on information. In various embodiments, the surface 202 of the intelligent reflecting device 124 may receive the signals as filtered signals that were filtered by at least one metasurface layer, which may be tunable or non-tunable. Further, the intelligent reflecting device 124 may notify a wireless access node 104 of the user group. In response, the wireless access node 104 may determine a scheduling result for the user devices in the user group according to information detected by the intelligent reflecting device 124, which may include at least one of operator information, angle information, distance information, location information, transmission quality information, or work requirements from different user devices 102 The wireless access node 104 may notify the user devices 102 part of the user group that they have been granted access, and may also notify the intelligent reflecting device 124. Also, the wireless access node 104 and/or the intelligent reflecting device 124 may determine a filter configuration for the at least one metasurface layer having a target frequency band of the user devices 102 granted access.

Also, in a training phase, if an intelligent reflecting device 124 receives user identification information of a user device 102 given access, the intelligent reflecting device may perform the following actions repeatedly. For embodiments where the surface 202 of the intelligent reflecting device 124 is covered by at least one non-tunable metasurface layer, the wireless access node 104 may determine a beam forming matrix, and a first matrix for the intelligent reflecting device 124. The wireless access node may send the first matrix to the intelligent reflecting device 124. Additionally, for embodiments where surface 202 of the intelligent reflecting device 124 is covered by at least one tunable metasurface layer, the wireless access node 104 may determine a beam-forming matrix, a first matrix for the intelligent reflecting device 124, and a second matrix for the at least one tunable metasurface layer. The wireless access node 104 may send the controller 204 of the first matrix to the intelligent reflecting device 124 and the second matrix to the controller 504 of the at least one tunable metasurface layer, which in turn may set the state and/or filter configurations for the surface elements 206 and the metasurface layer elements 502 based on the first matrix and the second matrix, respectively. The intelligent reflecting device 124 and/or the wireless access node 104 may perform the training phase and communicate signals repeatedly or continuously until user identification information of user devices 102 permitted access cannot be detected.

Also, in various embodiments, an intelligent reflecting device 124 and/or a wireless access node 104 may use a preamble sequence for situations where multiple user devices 102 simultaneously transmit signals to the intelligent reflecting device 124. In general, a preamble sequence may be a user device (UE)-specific orthogonal sequence, a random sequence, or a specific sequence configured to distinguish between different user devices 102. In addition or alternatively, the preamble sequence may include an informative sequence that includes information such as frequency information, location information, angle information, distance information, cell information, and/or work requirements. A preamble sequence may be used in embodiments where a wireless access node 104 determines a user group to serve and/or in embodiments where an intelligent reflecting device 124 determines a user group to serve.

For embodiments where the wireless access node 104 determines the user group to serve, an intelligent reflecting device 124 may first detect one or more preamble sequences from one or more user devices 102, and obtain user device information from the one or more preamble sequences. Then the intelligent reflecting device 124 may notify the wireless access node 104 of the preamble sequence and/or the user device information. In response, the wireless access node 104 may perform scheduling to determine a scheduling result based on the user device information carried by the preamble sequence. For particular embodiments, a preamble sequence for only a single user device 102 is detected, the wireless access node 104 determines whether to serve the single user device 102 based on the detected preamble sequence and/or the information carried by the preamble sequence. Also, for embodiments where preamble sequences for multiple user devices 102 are detected, the wireless access node 104 may determine which of the user devices 102 to be part of a user group to serve based on the preamble sequences. Further, the wireless access node 104 may notify the user device 102 or multiple user devices 102 of its decision, and sends information of the user devices 102 that are served to the intelligent reflecting device 124. Further, for embodiments where the surface 202 of the intelligent reflecting device 124 is covered by at least one metasurface layer, the wireless access node 104 and/or the intelligent reflecting device 124 determines a filter configuration having a target frequency band corresponding to the communication frequency of the user devices 102 part of the user group to serve. Also, the wireless access node 104 may determine a first matrix for the intelligent reflecting device 124 and a second matrix for the at least one metasurface layer, and send the first and second matrices to the intelligent reflecting device 124 and the at least one metasurface layer controller 504, respectively.

Additionally, for embodiments where an intelligent reflecting device 124 determines the user group to serve, the intelligent reflecting device 124 may first detect one or more preamble sequences from one or more user devices 102, obtain user device information from the one or more preamble sequences, and perform scheduling to determine a scheduling result based on the device information from the preamble sequences. Additionally, when a preamble sequence for a single user device 102 is detected, then intelligent reflecting device 124 may determine whether to serve the user device 102 based on the detected preamble information. Further, when multiple preamble sequences for multiple user devices 102 are detected, the intelligent reflecting device 124 may decide which of the user device 102 to be part of the user group to serve based on the preamble information. The intelligent reflecting device 124 may notify a wireless access node 104 of its decision, and the wireless access node may notify the user device or devices 102 of the decision. Also, the wireless access node 104 may determine a first matrix for the intelligent reflecting device 124 and/or select a beam through channel measurement information, and send the first matrix and/or information of the selected beam to the intelligent reflecting device 124. Further, for embodiments that use at least one metasurface layer, the wireless access node 104 may determine a filter configuration for the at least one metasurface layer having a frequency band corresponding to the frequency of the user devices 102 in the user group to serve. In addition or alternatively, the wireless access node 104 determines a second matrix for the at least one metasurface layer based on channel measurement information, and sends the second matrix to the controller 504 of the at least one metasurface layer.

Further, for embodiments where signals of multiple frequencies are received by an intelligent reflecting device 124, and where the intelligent reflecting device 124 does not have sufficient sensing ability (i.e., it merely passively reflects), the intelligent reflecting device 124 may not distinguish signals from different user devices 102 and/or devices configured for different telecom operators. Such intelligent reflecting devices 124 may be configured by its controller 204 to reflect signals to a wireless access node 104. In response, the wireless access node 104 detects access identification information and/or use identification information, and selects one or more user devices 102 to be part of a user group to be served based on the information.

Additionally, in an access phase, the wireless access node 104 and/or an intelligent reflecting device 124 may determine a first matrix for the intelligent reflecting device that can be used for signal reflection. For example, the controller 204 may receive the first matrix and configure the states for the surface elements 206 to perform the reflection. Additionally, for such embodiments, the wireless access node may detect the access identification information. The access identification information may include at least one of: operator information, frequency information, location information, azimuth information, angle information, cell information, user type information, or user channel information. Also, the wireless access node 104 may determine whether a given user device 102 accesses the network based on any of various factors, such as whether the given user device 102 belongs to the correct telecom operator, whether the given user device 102 belongs to a specific cell, whether a user transmission meets one or more preset conditions, whether a total number of users meets certain requirements, or whether the intelligent reflecting device has the ability to support a transmission with the given user device 102. Upon determining whether to grant access to the give user device 102, the wireless access node 104 may information the given user node 102 of the access determination, such as through downlink transmission. The wireless access node 104 may also notify the intelligent reflecting device of the access decision.

Further, in a transmission phase, a wireless access node 104 may determine a first matrix for an intelligent reflecting device 124, and detect and transmit user identification information. The user identification information may include at least one of a specific sequence, frequency information, location information, orientation information, angle information, user channel information, user type information, a user device identification (UE ID), or permitted access sequence of a user device 102. The wireless access node 104 may decide which user devices 102 to be part of a user group to serve. The wireless access node 105 may make the decision based on any of various criteria, including whether the user identification information of a user device 102 given access is detected, whether the channel of the network accessed by the user device 102 has changed significantly, whether a location of the user device 102 given access has changed above a predetermined threshold, or whether a number of user devices 102 accessed to the network meets restriction conditions. When the wireless access node 104 identifies a given user device 102 as transmission permitted, the intelligent reflection device 124 is configured to serve the given user device 102. On the other hand, when the wireless access node 104 identifies a given user device 102 as transmission non-permitted, the intelligent reflection device 124 stops serving the given user device 102, and the given user device 102 enters an idle state.

In addition, user device information included in incoming signals to an intelligent reflecting device 124 may be determined by channel measurement, and such user device information may be used by a wireless access node 102 or an intelligent reflecting device 124 to distinguish user devices 102. In various embodiments, the intelligent reflecting device 124 may initially assume access to all user devices 102, and reflect incoming signals to a wireless access node 104 according to a first matrix for the intelligent reflecting device 124. The wireless access node 104 may receive the reflected signals, and perform signal processing to obtain information, including operator information, frequency information, location information, distance information, orientation information, signal strength information, user type information, or service quality requirement information. Based on the obtained information, the wireless access node 104 may determine which user devices 102 to be part of a user group to serve. In addition, the wireless access node 104 may transmit a signal to the user devices 102 in the user group, which causes the user devices 102 to transmit. Also, the wireless access node 104 may transmit a signal to user devices 102 determined not to be part of the user group, which instructions those user devices 102 to interrupt signal transmission. Further, the wireless access node 104 may notify the intelligent reflecting device 124 of the user devices 102 determined to be part of the user group to serve, and a first matrix for the intelligent reflecting device 124.

Also, in various embodiments, a wireless access node 104 and/or an intelligent reflecting device 124 may serve multiple user devices 102 by forming narrow beams and segmenting or grouping the surface elements 206 of the surface 202 into different groups or segments. The intelligent reflecting device 124 may use a first matrix to reflect or transmit signals to the wireless access node 104. The wireless access node 104 detects incident signal information, including at least one of operator information, frequency information, position information, direction information, or intensity information. The wireless access node 104 decides which user devices 102 to be part of user group to serve based on the information. Correspondingly, the wireless access node 104 may instruct the intelligent reflecting device 124 to divide the surface elements 206 into surface element groups based on the user group decision, such as based on frequency or location identified by information in the different incident signals.

In addition, in various embodiments, a user device 102 may include operator identification information to signals it transmits to an intelligent reflecting device 124 when accessing the system 100. If the intelligent reflecting device 124 does not have sufficient sensing ability, the intelligent reflecting device 124 may reflect the signal to a wireless access node 104. In some embodiments, an intelligent reflecting device 124 is to exclusively serve only one telecom operator—i.e., serve only those user devices 102 operating or communicating with or according to that telecom operator. During the access process or access phase, the intelligent reflecting device 124 may reflect or output signals it receives to a wireless access node 104, and the wireless access node 104 may perform a signal detection process, detecting information including operator identification information, frequency information, angle information, distance information, location information, transmission quality information, or work demand information. The wireless access node 104 may determine which user devices 102 to be part of a UE group to serve based on the received operator identification information and an operator identifier for the telecom operator that the intelligent reflecting device 124 is designated to exclusively serve. In other embodiments, the wireless access node 104 may identify which user devices 102 to be part of a user group to serve based on at least one of: frequency information, angle information, distance information, location information, transmission qualify information, or work requirement information of the one or more user devices 102. With this information, the wireless access node 104 may select at least part of the user devices 102 to be part of the user group for access. Accordingly, the wireless access node 104 identifies at least one user device 102 to be part of a user group to serve through communication with the intelligent reflecting device 124. Further, the wireless access node 104 may determine a scheduling result for the one or more user device 102 part of the user group, and notifies the one or more user devices 102 part of the user group that they are permitted access to the network.

Additionally, in some embodiments, an intelligent reflecting device 124 is not configured to exclusively serve only one telecom operator. For such embodiments, during an access phase (procedure), the intelligent reflecting device 124 may receive one or more signals from one or more user device 102, and reflect the signals to a wireless access node 104. The wireless access node 104 may determine a scheduling result for user devices 102 configured for multiple telecom operators based on telecom operator information and at least one of frequency information, angle information, distance information, location information, transmission quality information, or work demand information. The wireless access node 104 may notify the user devices 102 of the scheduling result and notify the intelligent reflecting device 124 of the user group.

Also, in the transmission phase, the intelligent reflecting device 124 reflects signals it receives to a wireless access node 104 according to a first matrix for the intelligent reflecting device 124. In response, the wireless access node may perform signal detection. Upon detection, the wireless access node 104 may determine if information in the signals includes user identification information of a given user device 102 granted access. If so, then the wireless access node 104 may determine a first matrix or select an appropriate beam for user access and transmission according to channel measurement results. On the other hand, if the wireless access node 104 cannot detect user identification information of an accessed user 102, then the wireless access node 104 may determine a communication process with the user device 102.

Additionally, in various embodiments where an intelligent reflecting device 124 is not configured to exclusively serve only one telecom operator, if a scheduling result indicates that the intelligent reflecting device 124 is not to serve a given user device 102, signal energy from the given user device 102 may be collected and converted into the energy supply of the intelligent reflecting device 124. For embodiments where an intelligent reflecting device 124 is configured to exclusively serve only one telecom operator, when incorrect operator identification information is detected, the undesired telecom operator signals may be used for energy harvesting.

Additionally, for embodiments where an intelligent reflecting device 124/200 is configured to exclusively serve only one target telecom operator, the intelligent reflecting device 124/200 may include at least one metasurface layer covering the surface 202 of the intelligent reflecting device

124/200, as previously described. The intelligent reflecting device 124 may be configure to reflect or output signals, including signals filtered twice by the at least one metasurface layer, according to a first matrix for the intelligent reflecting device 124, to a wireless access node 104. In response, the wireless access node 104 detects the signals to obtain operator identification information. In addition, the wireless access node 104 may decide which user devices 102 to be part of a user group to serve according to a criterion that the intelligent reflecting device is configured to serve or work for only one telecom operator. In addition or alternatively, a wireless access node 104 determines which user devices 102 to be part of a user group to serve based on a least one of: operator information, frequency information, angle information, distance information, location information, transmission quality information, or work requirement information. In doing so, the wireless access node 104 may select at least one of the user devices 102 configured to the target telecom operator for access. Additionally, the wireless access node 104 may notify the intelligent reflecting device 124 of its decision, which includes access user information. Further, for embodiments where the at least one metasurface layer is non-tunable, the wireless access node 104 may determine a beamforming matrix and a first matrix for the intelligent reflecting device 124 based on channel measurement. Additionally, for embodiments where the at least one metasurface layer is tunable, the wireless access node 104 may determine a beamforming matrix, a first matrix for the intelligent reflecting device 124, and a second matrix for the at least one metasurface layer based on channel measurement.

Additionally, for embodiments where telecom operators have their own exclusive frequency bands, and where an intelligent reflecting device 124 is configured for non-exclusive use, i.e., configured for use with multiple telecom operators, the intelligent reflecting device 124 may reflect or output signals it receives to a wireless access node 104 according to a first matrix for the intelligent reflecting device 124, and the wireless access node 104 determines information in the signals. In response to the information, the wireless access node 104 determines a scheduling result for the multiple user devices 102, and may select which of the user devices 102 to be part of a user group to be served based on at least one of: frequency information, direction information, intensity information, transmission quality information, or transmission requirements. For such embodiments, including where the at least one metasurface layer is tunable, the wireless access node 104 may determine a filter configuration for the at least one metasurface layer according to the frequency band or bands of the user devices permitted with access. The wireless access node 104 may send the access permission information to the user devices 102, and notify the intelligent reflecting device of the access permission information.

Also, for embodiments where telecom operators do not have their own exclusive frequency bands (i.e., they have spectrum sharing), and where an intelligent reflecting device 124 is configured for exclusive use with only one target telecom operator, frequency band information may no longer be used as a basis for distinguishing telecom operators. For such embodiments, an intelligent may output or reflect signals it receives from one or more user devices 102 to a wireless access node 104 according to a first matrix for the intelligent reflecting device 124. In response, the wireless access node 104 detects user device information, including at least one of operator attribution information, angle information, distance information, location information, transmission quality information, or work requirements information of different user devices 102. In addition, the wireless access node 104 directly decides which user devices 102 to be part of a user group to serve according to user operator identification information, or according to at least one of: operator information, angle information, distance information, location information, transmission quality information, or work demand information. In doing so, the wireless access node 104 may select at least one user device 102 to be part of the user group that is configured for the same telecom operator as the intelligent reflecting device 124. Additionally, all or at least some of the correct user devices 102 (i.e., those that are configured for the same telecom operator as the intelligent reflecting device 124 is configured to exclusively serve) may be determined to be part of the user group (accessed). In addition, the wireless access node 104 sends access permission information to the user devices 102 of the user group and informs the intelligent reflecting device 124 of the user group. Further, the wireless access node 104 and/or the intelligent reflecting device 124 may determine a filter configuration for at least one metalayer surface having a target frequency band corresponding to the communication frequency of the user device 102 in the user group.

Also, for embodiments where the telecom operators perform spectrum sharing (the telecom operators do not have exclusive use of frequency bands), and where the intelligent reflecting device 124 is not configured for exclusive use with only one telecom operator, the intelligent reflecting device 124 may reflect or output signals it receives from user devices 102 to a wireless according node 104 according to a first matrix for the intelligent reflecting device 124. In response, the wireless access node 104 may detect user device information, including at least one of operator identification information, angle information, distance information, location information, transmission quality information, or work requirements of different user devices 102. Based on the information, the wireless access node 104 may determine which user devices 102 to be part of a user group to have access and a scheduling result for the user devices 102.

Additionally, the wireless access node 102 sends access permission information to the user devices 102 and notifies the intelligent reflecting device 124 of the user devices 102 granted access. Also, the wireless access node 104 and/or the intelligent reflecting device 124 may determine a filter configuration for the at least one metasurface layer having a target frequency band of the user devices 102 granted access.

Additionally, during an access phase or process, the first matrix for the intelligent reflecting device that is determined may affect the strength of signals of different frequencies reaching a wireless access node 104. Accordingly, a first matrix for the intelligent reflecting device 124 may be determined according to at least one of the following criteria: the first matrix is the same as that used at a previous predetermined time; the first matrix is selected as a definite reflection matrix, such as a Discrete Fourier Transform (DFT) codebook; the first matrix is determined according to statistical channel information; the first matrix is designed as a random matrix; the first matrix is determined according to fixed positions of the intelligent reflecting device 124 and the wireless access node.

Also, in a training phase, the first matrix for the intelligent reflecting device 124 may be updated, including updated a plurality of times. If the wireless access node 104 continuously receives user identification information of an accessed user device 102, the wireless access node 104 may perform the following steps continuously: the wireless access node may measure channel state information. For embodiments where the surface 202 of the intelligent reflecting device 124 is covered by at least one non-tunable metasurface layer, the wireless access node 104 may determine a beam forming matrix, and a first matrix for the intelligent reflecting device 124. The wireless access node may send the first matrix to the intelligent reflecting device 124. Additionally, for embodiments where surface 202 of the intelligent reflecting device 124 is covered by at least one tunable metasurface layer, the wireless access node 104 may determine a beamforming matrix, a first matrix for the intelligent reflecting device 124, and a second matrix for the at least one tunable metasurface layer. The wireless access node 104 may send the controller 204 of the first matrix to the intelligent reflecting device 124 and the second matrix to the controller 504 of the at least one tunable metasurface layer, which in turn may set the state and/or filter configurations for the surface elements 206 and the metasurface layer elements 502 based on the first matrix and the second matrix, respectively. The intelligent reflecting device 124 and/or the wireless access node 104 may perform the training phase and communicate signals repeatedly or continuously until user identification information of user devices 102 permitted access cannot be detected.

Also, in various embodiments, an intelligent reflecting device 124 and/or a wireless access node 104 may use a preamble sequence to determine user device information for situations where multiple user devices 102 simultaneously transmit signals to the intelligent reflecting device 124.

In order to determine which user devices 102 to be part of a user group to serve, the intelligent reflecting device 124 may reflect or output signals to the wireless access node 104 it receives from one or more user devices 102 according to a first matrix for the intelligent reflecting device 124. In response to receipt of the signals, the wireless access node 104 detects a user device preamble sequence, obtains user-related information from the preamble sequence, and performs scheduling to determine a scheduling result for one or more user devices 102. For particular embodiments, a preamble sequence for only a single user device 102 is detected, the wireless access node 104 determines whether to serve the single user device 102 based on the detected preamble sequence and/or the information carried by the preamble sequence. Also, for embodiments where preamble sequences for multiple user devices 102 are detected, the wireless access node 104 may determine which of the user devices 102 to be part of a user group to serve based on the preamble sequences. Further, the wireless access node 104 may notify the user device 102 or multiple user devices 102 of its decision, and sends information of the user devices 102 that are served to the intelligent reflecting device 124. Further, for embodiments where the surface 202 of the intelligent reflecting device 124 is covered by at least one metasurface layer, the wireless access node 104 and/or the intelligent reflecting device 124 determines a filter configuration having a target frequency band corresponding to the communication frequency of the user devices 102 part of the user group to serve. Also, the wireless access node 104 may determine a first matrix for the intelligent reflecting device 124 and a second matrix for the at least one metasurface layer, and send the first and second matrices to the intelligent reflecting device 124 and the at least one metasurface layer controller 504, respectively.

Figure 7:
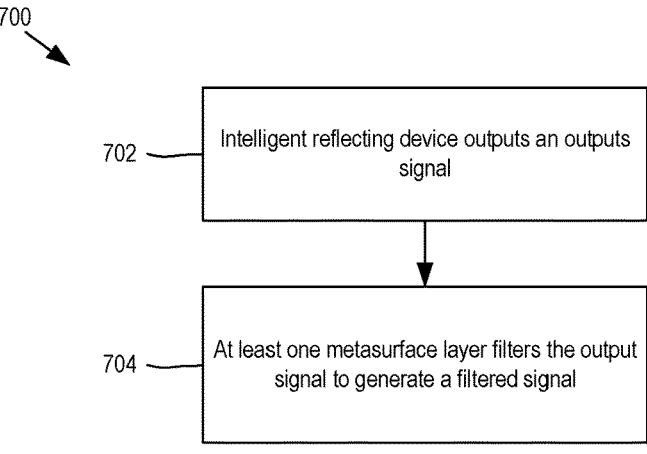
FIG. 7 shows a flow chart of an example wireless communication method.

In accordance with the above, FIG. 7 show a flow chart of an example method of wireless communication 700 with an intelligent reflecting device 124 having a surface covered by at least one metasurface layer. At block 702, a surface 202 of an intelligent reflecting device 124/200 may output an output signal. In various embodiments, the output signal is a reflected signal or a signal that the intelligent reflecting device 124 actively generate and outputs. At block 704, the at least one metasurface layer may filter the output signal a filtered signal. The filtered signal may be communicated to another communication node in the system 100, such as a wireless access node 104 or a user device 102.

Figure 8:
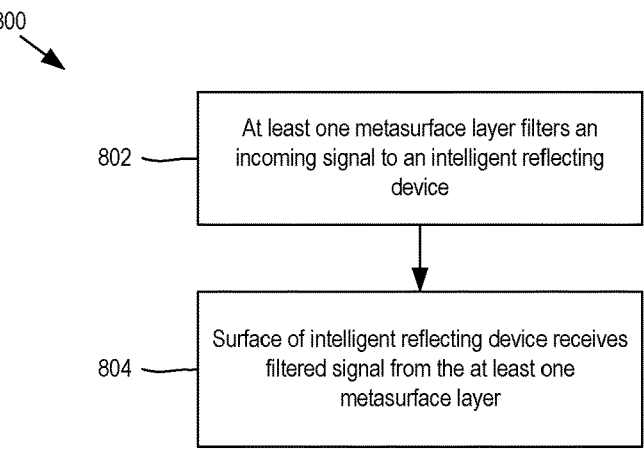
FIG. 8 shows a flow chart of another example wireless communication method.

FIG. 8 shows a flow chart of another example method of wireless communication 800 with an intelligent reflecting device 124 having a surface covered by at least one metasurface layer. At block 802, the at least one metasurface layer may filter an incident or incoming signal to generate a filtered signal. At block 804, the surface 202 of the intelligent reflecting device 124 may receive the filtered signal. Other methods combining the methods 700 and 800 may be possible. For example, in various embodiments, the signal output at block 702 may be a reflected version of the signal that the surface 202 receives at block 804.

Additionally, any of various additional embodiments of the methods 700 and/or 800 may include any of the actions performed as described above. For example, the filtering performed by the at least one metasurface layer may be according to one or more filter configurations. A signal that is received may be for a telecom operator. For example, the signal may have frequency components configured for the telecom operator. In addition or alternatively, the filtering performed may be for frequencies corresponding to multiple telecom operators. In addition or alternatively, the at least one metasurface layer may comprise at least one of a passband filter, a low-pass filter, a high-pass filter, or a band-stop filter, as previously described. In addition or alternatively, the at least one metasurface layer is tunable or non-tunable, as previously described.

Figure 9:
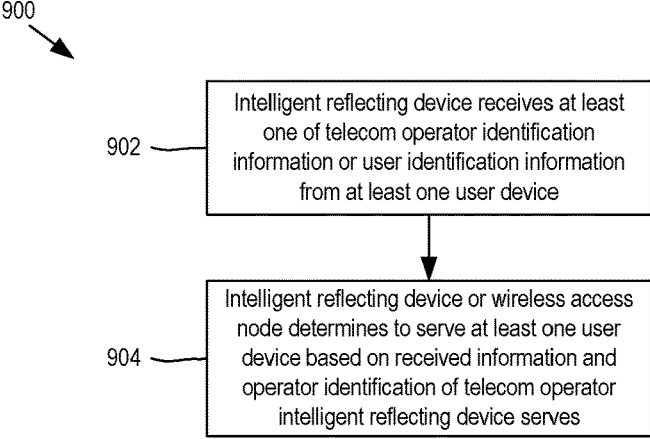
FIG. 9 shows a flow chart of another example wireless communication method.

FIG. 9 is a flow chart of another example method of wireless communication 900 with an intelligent reflecting device 124. At block 902, the intelligent reflecting device 124 may receive at least one of telecom operator identification information or user identification information from at least one user device 102. At block 904, the intelligent reflecting device 124 or a wireless access node may determine to serve at least one user device based on the operator identification information or the user identification information and an operator identification of a telecom operator the intelligent reflecting device is configured to serve. Various other embodiments of the method 900 are possible, including those incorporating any of the above-described actions.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The subject matter of the disclosure may also relate to or include, among others, the following aspects:

Aspect 1. A method for wireless communication, the method comprising:

outputting, with a surface of an intelligent reflecting device, an output signal; and filtering, with at least one metasurface layer covering the surface of an intelligent reflecting device, the signal to generate a filtered signal.

Aspect 2. The method of aspect 1, further comprising:

filtering, with the at least one metasurface layer, an incoming signal to generate a filtered incident signal; and receiving, with the surface of the intelligent reflecting device, the filtered incident signal.

Aspect 3. The method of aspect 2, wherein outputting the output signal comprises:

reflecting, with the surface, the filtered incident signal.

Aspect 4. The method of aspects 2 or 3, wherein the incident signal comprises a first incident signal communicated for a first telecom operator, and wherein filtering the incident signal comprises filtering, with the at least one metasurface layer, the first incident signal according to a first filter configuration corresponding to the first telecom operator, the method further comprising:

filtering, with the at least one metasurface layer, a second incident signal according to a second filter configuration corresponding to a second telecom operator.

Aspect 5. The method of any of aspects 1-4, wherein the at least one metasurface layer comprises a passband filter.

Aspect 6. The method of any of aspects 1-4, wherein the at least one metasurface layer comprises a low-pass filter.

Aspect 7. The method of any of aspects 1-4, wherein the at least one metasurface layer comprises a high-pass filter.

Aspect 8. The method of any of aspects 1-4, wherein the at least one metasurface layer comprises a band-stop filter.

Aspect 9. The method of any of aspects 1-8, wherein the at least one metasurface layer is tunable.

Aspect 10. The method of any of aspects 1-8, wherein the at least one metasurface layer is non-tunable.

Aspect 11. The method of any of aspects 1-10, further comprising:

determining, with a communication node, a beamforming matrix of the communication node, a first matrix for the intelligent reflecting device, and a second matrix for the at least one metasurface layer based on measured channel information.

Aspect 12. The method of aspect 11, wherein determining the beamforming matrix, the first matrix, and the second matrix comprises:

determining, with the communication node, the beamforming matrix and the first matrix based on the measured channel information and a state configuration of metasurface layer elements of the at least one metasurface layer during a first time period that the at least one metasurface layer is not adjusted; and determining, with the communication mode, the beamforming matrix, the first matrix, and the second matrix based on the measured channel information during a second time period that the at least one metasurface layer is adjusted.

Aspect 13. The method of any of aspects 1-12, wherein the at least one metasurface layer comprises a set of metasurface layer elements configured in a state configuration corresponding to a target filter configuration according to which the at least one metasurface layer filters the incident signal.

Aspect 14. The method of any of aspects 1-13, wherein the at least one metasurface layer comprises only one metasurface layer.

Aspect 15. The method of any of aspects 1-13, wherein the at least one metasurface layer comprises a stack of a plurality of metasurface layers.

Aspect 16. The method of aspect 15, wherein each of the plurality of metasurface layers comprises an associated set of metasurface layer elements, each set configured in a different one of a plurality of stage configurations, each stage configuration corresponding to a different one of a plurality of target filters.

Aspect 17. The method of aspect 16, wherein the plurality of target filters each correspond to a different one of a plurality of passbands.

Aspect 18. The method of any of aspects 1-17, further comprising:

changing, with a controller, a filter configuration of the least one metasurface layer.

Aspect 19. The method of aspect 18, further comprising:

receiving, with the controller, a first matrix for the intelligent reflecting device and a second matrix for the at least one metasurface layer; and changing, with the controller, the filter configuration based on the first matrix and the second matrix.

Aspect 20. The method of aspect 18, wherein changing the filter configuration comprises changing, with the controller, a passband of the filter configuration based on a number of user equipment devices.

Aspect 21. The method of aspect 18, wherein changing the filter configuration comprises:

changing, with the controller, a state configuration of a plurality of metasurface layer elements of the at least one metasurface layer.

Aspect 22. A method for wireless communication, the method comprising:

receiving, with an intelligent reflecting device, at least one of telecom operator identification information or user identification information from at least one user device; and determining, with at least one of the intelligent reflecting device or a wireless access node, to serve the at least one user device based on the operator identification information or the user identification information and an operator identification of a telecom operator the intelligent reflecting device is configured to serve.

Aspect 23. The method of aspect 22, further comprising:

receiving, with the wireless access node, the operator identification information from the intelligent reflecting device, wherein the wireless access node determines to serve the at least one user device, and wherein the determining to serve is further based on at least one of frequency information, angle information, distance information, location information, transmission quality information, or work demand information.

Aspect 24. The method of aspect 23 further comprising:

terminating, with the wireless access node, a communication with the at least one user device in response to the intelligent reflecting device not detecting user identification information for the at least one user device.

Aspect 25. The method of aspect 22, further comprising:

comparing, with the intelligent reflecting device, the operator identification with the telecom operator identification information; and determining, with the intelligent reflecting device, to serve the at least one user device based on the comparison.

Aspect 26. The method of aspect 25, further comprising:

determining, with the intelligent reflecting device or the wireless access node, a scheduling result corresponding to the determining to serve.

Aspect 27. The method of any of aspects 22-26, further comprising:

filtering out, with a metasurface layer covering a surface of the intelligent reflecting device, signals transmitted from devices served by other telecom operators other than a telecom operator that the intelligent reflecting device exclusively serves.

Aspect 28. The method of any of aspects 22-27, further comprising:

determining, with the wireless access node, a beamforming matrix and at least one of a first matrix for the intelligent reflecting device or a second matrix for at least one metasurface layer covering a surface of the intelligent reflecting device.

Aspect 29. The method of aspect 28, wherein the wireless access node determines both the first matrix and the second matrix, and wherein the at least one metasurface layer is tunable.

Aspect 30. The method of any of aspects 22-29, wherein the telecom operator identification information comprises a single frequency, and wherein determining to grant access to the at least one UE device is further based on the intelligent reflecting device not being exclusive to only one telecom operator.

Aspect 31. The method of any of aspects 22-29, wherein the telecom operator identification information comprises multiple frequencies, the method further comprising:

sending, with the intelligent reflecting device, the telecom operator identification information to the wireless access node; and determining, with the wireless access node, to serve the at least one user device and scheduling information for the at least one user device based on the telecom operator identification information and at least one of: operator information, frequency information, direction information, intensity information, transmission quality information, or transmission requirements;

determining, with the wireless access node, a filter configuration for a metasurface layer covering a surface of the intelligent reflecting device; and sending, with the wireless access node, the filter configuration and access information to the intelligent reflecting device.

Aspect 32. The method of any of aspects 22-31, further comprising:

configuring a metasurface layer covering a surface of the intelligent reflecting device with a filter configuration having a pass frequency corresponding to a frequency of the at least one user device granted access.

Aspect 33. The method of any of aspects 22-32, further comprising:

during a training phase:

continuously receiving, with the intelligent reflecting device, the user identification information of the at least one UE device;

determining, with the wireless access node, a beamforming matrix, a first matrix for the intelligent reflecting device, and a second matrix for at least one metasurface layer covering a surface of the intelligent reflecting device; and transmitting the first matrix to the intelligent reflecting device and the second matrix to the at least one metasurface layer until the user identification information cannot be detected.

Aspect 34. The method of any of aspects 22-33, further comprising:

determining, with at least one of the intelligent reflecting device or the wireless access node, the user identification information from a preamble sequence.

Aspect 35. The method of aspect 34, wherein the preamble sequence is for a single user device of the at least one user device.

Aspect 36. The method of aspect 34, wherein the preamble sequence is for multiple user devices of the at least one user device.

Aspect 37. The method of any of aspects 22-36, further comprising:

filtering, with at least one metasurface layer covering a surface of the intelligent reflecting device, a signal carrying at least one of the telecom operator information or the user identification information before being received by the surface of the intelligent reflecting device.

Aspect 38. The method of any of aspects 22-37, further comprising:

filtering, with at least one metasurface layer covering a surface of the intelligent reflecting device, a reflected signal from the surface carrying at least one of the telecom operator identification information or user identification information.

Aspect 39. The method of any of aspects 22-38, further comprising:

reflecting, with the intelligent reflecting device, one or more signals comprising at least one of the telecom operator identification information or the user identification information, wherein the intelligent reflecting device does not have sensing ability to detect the telecom operator identification or the user identification information in the one or more signals.

Aspect 40. The method of any of aspects claim 22-39, wherein the intelligent reflecting device is configured to exclusively serve the telecom operator.

Aspect 41. The method of any of aspects 22-39, wherein the intelligent reflecting device is configured to non-exclusively serve the telecom operator.

Aspect 42. The method of any of aspects 22-39, wherein the telecom operator that the intelligent reflecting device serves has exclusive use of a target frequency band.

Aspect 43. The method of any of aspects 22-39, wherein the telecom operator that the intelligent reflecting device serves shares frequency bands with other telecom operator.

Aspect 44. An system comprising an intelligent reflecting device configured to perform a method recited in any of aspects 1-43.

Aspect 45. A computer program product comprising a computer-readable program medium stored thereupon, the code, when executed by a processor, causing the processor to implement a method recited in any of aspects 1-43.

In addition to the features mentioned in each of the independent aspects enumerated above, some examples may show, alone or in combination, the optional features mentioned in the dependent aspects and/or as disclosed in the description above and shown in the figures.

The invention claimed is:

1. A method for wireless communication, the method comprising:

receiving, with an intelligent reflecting device, at least one of telecom operator identification information or user identification information from at least one user device; and determining, with at least one of the intelligent reflecting device or a wireless access node, to serve the at least one user device based on the operator identification information or the user identification information and an operator identification of a telecom operator the intelligent reflecting device is configured to serve.

2. The method of claim 1, further comprising:

receiving, with the wireless access node, the operator identification information from the intelligent reflecting device, wherein the wireless access node determines to serve the at least one user device, and wherein the determining to serve is further based on at least one of frequency information, angle information, distance information, location information, transmission quality information, or work demand information.

3. The method of claim 2, further comprising:

terminating, with the wireless access node, a communication with the at least one user device in response to the intelligent reflecting device not detecting user identification information for the at least one user device.

4. The method of claim 1, further comprising:

comparing, with the intelligent reflecting device, the operator identification with the telecom operator identification information; and determining, with the intelligent reflecting device, to serve the at least one user device based on the comparison; and determining, with the intelligent reflecting device or the wireless access node, a scheduling result corresponding to the determining to serve.

5. The method of claim 1, further comprising:

filtering out, with a metasurface layer covering a surface of the intelligent reflecting device, signals transmitted from devices served by other telecom operators other than a telecom operator that the intelligent reflecting device exclusively serves.

6. The method of claim 1, further comprising:

determining, with the wireless access node, a beamforming matrix, a first matrix for the intelligent reflecting device, and a second matrix for at least one metasurface layer covering a surface of the intelligent reflecting device, wherein the at least one metasurface layer is tunable.

7. The method of claim 1, wherein the telecom operator identification information comprises a single frequency, and wherein determining to grant access to the at least one user devi user device is further based on the intelligent reflecting device not being exclusive to only one telecom operator.

8. The method of claim 1, wherein the telecom operator identification information comprises multiple frequencies, the method further comprising:

sending, with the intelligent reflecting device, the telecom operator identification information to the wireless access node; and determining, with the wireless access node, to serve the at least one user device and scheduling information for the at least one user device based on the telecom operator identification information and at least one of: operator information, frequency information, direction information, intensity information, transmission quality information, or transmission requirements;

determining, with the wireless access node, a filter configuration for a metasurface layer covering a surface of the intelligent reflecting device; and sending, with the wireless access node, the filter configuration and access information to the intelligent reflecting device.

9. The method of claim 1, further comprising:

configuring a metasurface layer covering a surface of the intelligent reflecting device with a filter configuration having a pass frequency corresponding to a frequency of the at least one user device granted access.

10. The method of claim 1, further comprising:

during a training phase:

continuously receiving, with the intelligent reflecting device, the user identification information of the at least one user device;

determining, with the wireless access node, a beamforming matrix, a first matrix for the intelligent reflecting device, and a second matrix for at least one metasurface layer covering a surface of the intelligent reflecting device; and transmitting the first matrix to the intelligent reflecting device and the second matrix to the at least one metasurface layer until the user identification information cannot be detected.

11. The method of claim 1, further comprising:

determining, with at least one of the intelligent reflecting device or the wireless access node, the user identification information from a preamble sequence.

12. The method of claim 11, wherein the preamble sequence is for a single user device of the at least one user device.

13. The method of claim 11, wherein the preamble sequence is for multiple user devices of the at least one user device.

14. The method of claim 1, further comprising:

filtering, with at least one metasurface layer covering a surface of the intelligent reflecting device, a signal carrying at least one of the telecom operator information or the user identification information before being received by the surface of the intelligent reflecting device.

15. The method of claim 1, further comprising:

filtering, with at least one metasurface layer covering a surface of the intelligent reflecting device, a reflected signal from the surface carrying at least one of the telecom operator identification information or user identification information.

16. The method of claim 1, further comprising:

reflecting, with the intelligent reflecting device, one or more signals comprising at least one of the telecom operator identification information or the user identification information, wherein the intelligent reflecting device does not have sensing ability to detect the telecom operator identification or the user identification information in the one or more signals.

17. The method of claim 1, wherein the intelligent reflecting device is configured to exclusively serve the telecom operator or non-exclusively serve the telecom operator.

18. The method of claim 1, wherein the telecom operator that the intelligent reflecting device serves at least one of: has exclusive use of a target frequency band, or shares frequency bands with other telecom operator.

19. A system comprising:

an intelligent reflecting device configured to:

receive at least one of telecom operator identification information or user identification information from at least one user device; and determine to serve the at least one user device based on the operator identification information or the user identification information and an operator identification of a telecom operator the intelligent reflecting device is configured to serve.

\* \* \* \* \*